United States Patent
Kramer

[11] Patent Number: 6,059,506
[45] Date of Patent: *May 9, 2000

[54] FORCE FEEDBACK AND TEXTURE SIMULATING INTERFACE DEVICE

[75] Inventor: James F. Kramer, Stanford, Calif.

[73] Assignee: Virtual Technologies, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/858,737

[22] Filed: May 19, 1997

Related U.S. Application Data

[63] Continuation of application No. 08/373,531, Jan. 17, 1995, Pat. No. 5,631,861, which is a continuation of application No. 07/929,895, Aug. 10, 1992, abandoned, which is a continuation-in-part of application No. 07/474,168, Feb. 2, 1990, Pat. No. 5,184,319.

[51] Int. Cl.[7] .................................................. B25J 3/00

[52] U.S. Cl. .................................. 414/5; 395/99; 364/806

[58] Field of Search .................... 414/4, 5, 6; 395/99; 364/806; 340/407.1; 74/500.5, 490.12, 479.01

[56] References Cited

U.S. PATENT DOCUMENTS

| | | | |
|---|---|---|---|
| 3,263,824 | 8/1966 | Jones et al. | 214/1 |
| 3,923,166 | 12/1975 | Fletcher et al. | 214/1 |
| 4,046,262 | 9/1977 | Vykukal et al. | 214/1 |
| 4,302,138 | 11/1981 | Zarudiansky | 414/5 |
| 4,414,984 | 11/1983 | Zarudiansky | 128/774 |
| 4,510,574 | 4/1985 | Guittet et al. | 364/513 |
| 4,575,297 | 3/1986 | Richter | 414/5 |
| 4,584,625 | 4/1986 | Kellogg | 361/283 |
| 4,655,673 | 4/1987 | Hawkes | 414/730 |
| 4,661,032 | 4/1987 | Arai | 414/5 |
| 4,853,874 | 8/1989 | Iwamoto et al. | 364/513 |
| 4,962,448 | 10/1990 | DeMaio et al. | 364/146 |
| 4,988,981 | 1/1991 | Zimmerman et al. | 340/709 |
| 5,004,391 | 4/1991 | Burdea | 414/6 |
| 5,047,952 | 9/1991 | Kramer et al. | 364/513.5 |
| 5,184,319 | 2/1993 | Kramer | 364/806 |
| 5,631,861 | 5/1997 | Kramer | 364/806 |

*Primary Examiner*—Donald W. Underwood
*Attorney, Agent, or Firm*—Flehr Hohbach Test Albritton & Herbert LLP

[57] ABSTRACT

A man-machine interface is disclosed which provides force, texture, pressure and temperature information to sensing body parts. The interface is comprised of a force-generating device (900) that produces a force which is transmitted to a force-applying device (902) via force-transmitting means (908). The force-applying device applies the generated force to a sensing body part. A force sensor (909) associated with the force-applying device measures the actual force applied to the sensing body part, while angle sensors (917) measure the angles of relevant joint body parts. A computing device (911) uses the joint body part position information to determine a desired force value to be applied to the sensing body part. The computing device combines the joint body part position information with the force sensor information to calculate the force command which is sent to the force-generating device. In this manner, the computing device may control the actual force applied to a sensing body part to a desired force which depends upon the positions of related body parts. In addition, the interface is comprised of a displacement-generating device (901) which produces a displacement which is transmitted to a displacement-applying device (902) (e.g., a texture simulator) via displacement-generating means (920). The displacement-applying device applies the generated displacement to a sensing body part. The force-applying device and displacement-applying device may be combined to simultaneously provide force and displacement information to a sensing body part. Furthermore, pressure and temperature-applying devices may be combined to also provide pressure and temperature sensations to a sensing body part. In addition, a force-applying device may be attached to a sensing body part and apply force to the sensing body part, where the force is applied relative to a reference location not rigidly affixed to the living body.

6 Claims, 34 Drawing Sheets

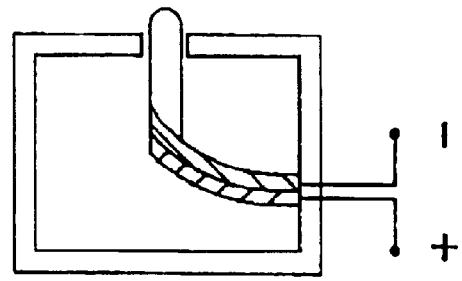
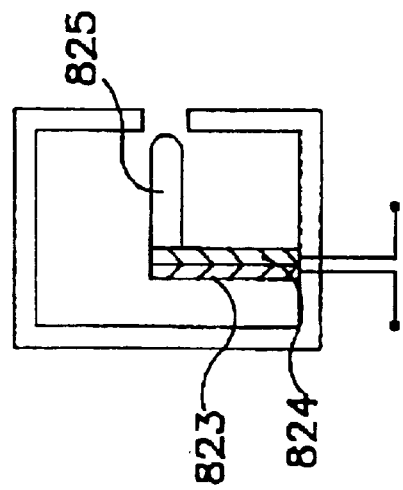
FIG. 8j
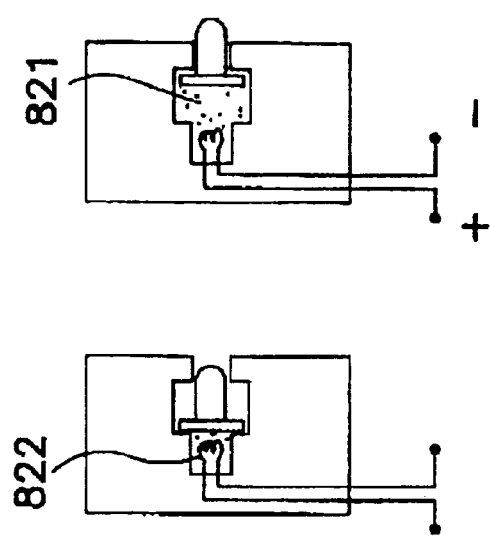
FIG. 8i

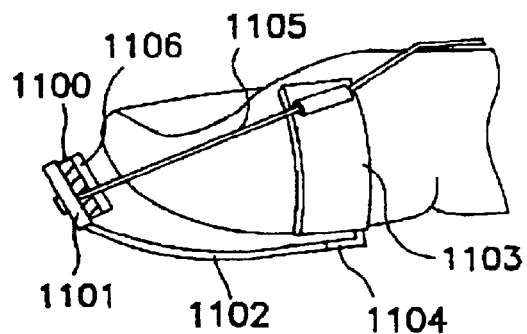
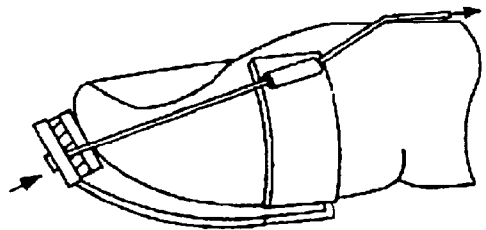
FIG. 11a
FIG. 11b
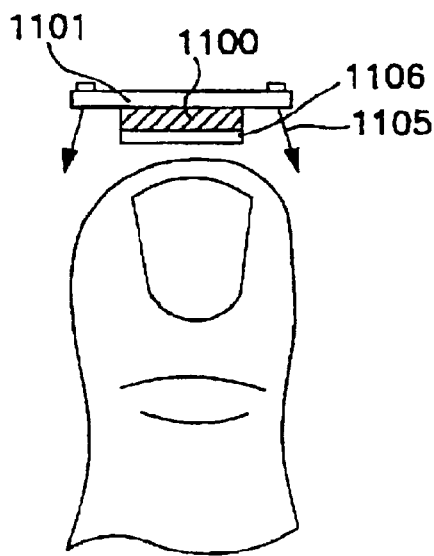
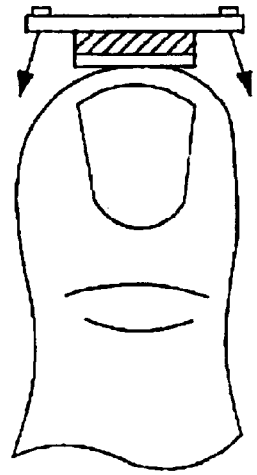
FIG. 11c
FIG. 11d

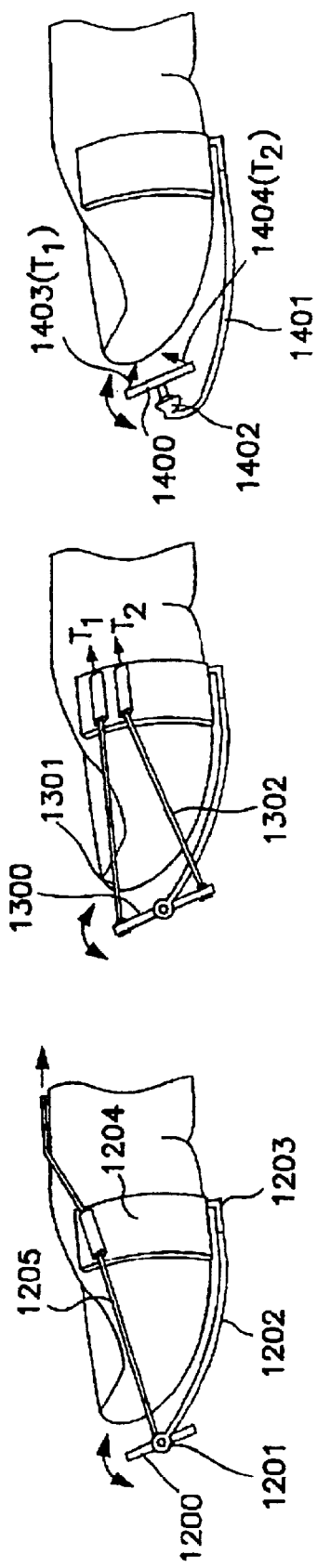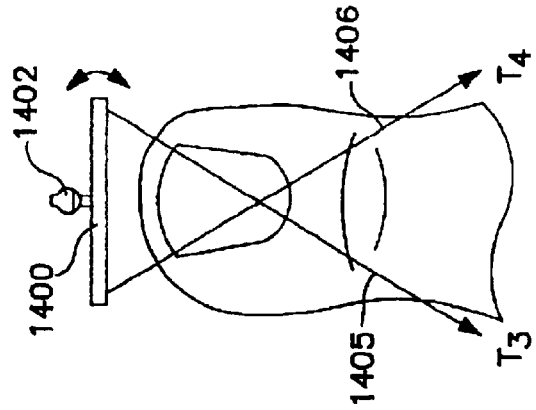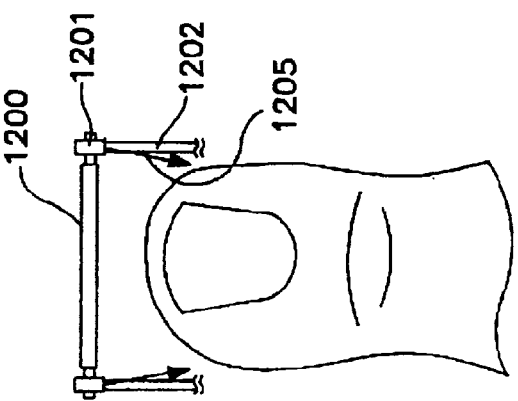

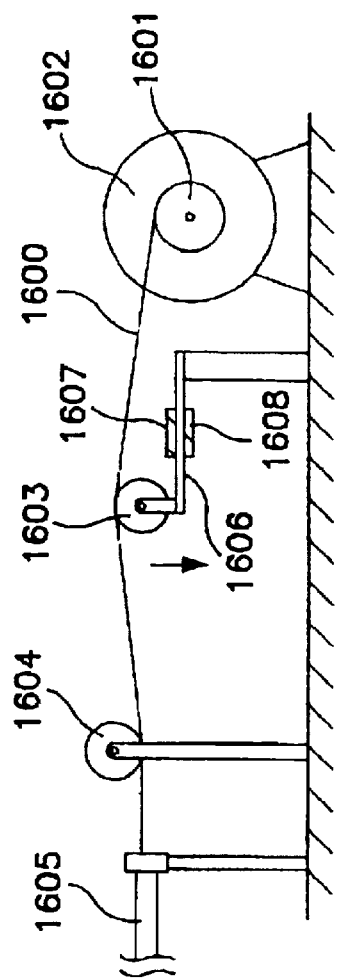
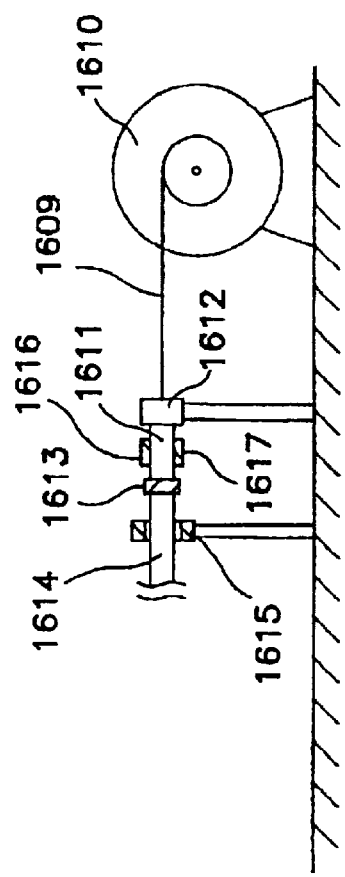
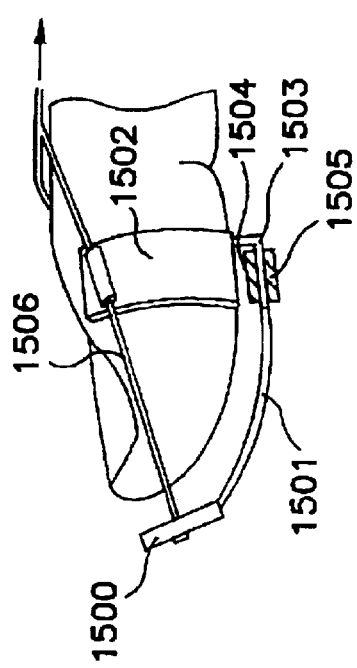

FORCE FEEDBACK AND TEXTURE SIMULATING INTERFACE DEVICE

This application is a continuation of application Ser. No. 08/373,531 filed Jan. 17, 1995, U.S. Pat. No. 5,631,861, which was a continuation of Ser. No. 07/929,895 filed Aug. 10, 1992, now abandoned, which was a continuation-in-part of Ser. No. 07/474,168 filed Feb. 2, 1990, U.S. Pat. No. 5,184,319.

TECHNICAL FIELD

This invention relates to a man-machine interface and in particular to an interface that measures body part positions and provides force, texture, pressure and temperature feedback to a user.

BACKGROUND OF THE INVENTION

A new manner of computer interaction is now in its infancy. The words "virtual environment" or "virtual reality" will soon be commonplace. A virtual environment is an environment where some portion of the environment is artificially simulated, most often via a computer. A computer may create a graphic simulation of an environment, complete with graphic images of chairs, windows, doors, walls, etc., and even images of other people. The computer may also simulate environmental sounds. The generated objects may be viewed on a common two dimensional display, such as a computer screen, or, by viewing with special stereoscopic equipment, the objects may be made to appear three dimensional.

The most natural way for an individual to interact in a virtual environment is to directly control a graphical representation of himself. For example, if the individual turns his head, the display screen at which he is looking is appropriately updated. Also, if the individual reaches out and closes his hand, the computer generated image of his hand on the screen reaches out and closes. Such virtual environments have been discussed in the literature.

To create the sensation of a virtual reality, the computer should be able to generate and manipulate graphic images of real or imaginary objects in real time. Although generating a graphic representation of an environment may be time consuming and non-trivial to implement, much of the theory has been explored and is well-understood by those skilled in the art of interactive 3D computer graphics and solid modeling. The invention described here pertains to the important related area in which relatively little research has been done, i.e., "How may a human user perceive grasping force and texture from his computer generated counterpart in the virtual environment?"

There are many peripheral devices which have been created to allow a user to enter information into the computer. The most notable of these is the standard QWERTY keyboard. Besides the numerous modifications of this "key input" concept, there are many other devices with their associated permutations. A partial list of such devices includes mice, joy-sticks, trackballs and Computer Aided Design (CAD) tablets. The main drawback of these computer input devices is that they don't permit human users to enter information in a manner which may be the most efficient and natural. For example, in a CAD software program, the human designer may wish to rotate a 3-D graphic representation of a block on a computer screen to view and modify the hidden side. Using currently available input devices, the designer must select the axis or a sequence of axes about which the object must be rotated to achieve the desired orientation and view. After the desired aids is selected, the amount of angular rotation must be determined, usually by the linear motion of a mouse or by entering the desired amount of rotation as a decimal quantity via the keyboard. This whole procedure seems very awkward and unintuitive when compared to what a person would normally do when confronted with a similar task in the "real world," i.e., he would simply reach out, pick up and rotate the object! Providing feedback for this more natural approach to object/environment interaction is an object of this invention.

Instrumented gloves which provide finger position information to the computer have been used to manipulate simulated objects in virtual environments. Such gloves have also been used in telerobotics to control highly dextrous end-effectors to grasp real objects. However, lack of force feedback to the glove wearer has reduced the effectiveness of these open-loop manipulation approaches. Imagine a 3-D graphic model of an egg on a computer screen. Suppose you are wearing a glove which maps your finger and hand motions to a graphic image of a hand on the same screen as the egg. As you move your hand and fingers, the corresponding graphic images of the hand and fingers move in a similar manner. The task is to move your own hand and fingers to control the graphic hand on the computer screen to pick up the egg. To accomplish this task you must provide enough force to reliably grasp and lift the virtual egg, but not so much force such that the egg is crushed. Without some kind of grasping force and tactile feedback, this task would be extremely difficult.

Attempts have been made to provide information about simulated contact with virtual or telemanipulated objects to senses other than the corresponding tactile senses. One method of simulated feedback which has been tested uses audible cues. For example, the computer may beep when contact is made. Another simple method is to highlight the object once contact is made. Both these methods will require the user to re-learn hand-eye coordination. It may be frustrating and time consuming for the user to learn one of these "unnatural" methods of grasping an object, and the sensation of interacting in a virtual environment will be reduced.

SUMMARY OF THE INVENTION

An object of the invention is a man-machine interface which may be employed in interactive computer applications.

Another object of the invention is a force feedback control system capable of controlling a set force to a selected part of the body, e.g., the finger tip.

Still another object of the invention is a man-machine system capable of simulating textures on a selected part of the body, e.g., the finger tip.

Another object of the invention is a man-machine system capable of applying a set pressure on a selected part of the body, e.g., the hand.

Still another object of the invention is a man-machine system capable of applying a set tempurature to a selected part of the body, e.g., the finger tip.

Yet another object of the invention is a man-machine interface comprised of a glove capable of sensing finger and hand positions and hand orientation, which may exert, measure and dynamically vary and control the forces applied to each finger, and which may vary the tactile array pattern presented to each finger tip, and which may vary the pressure applied to a portion of the hand, and which may vary the temperature applied to a portion of the hand.

Another object of the invention is a digital control system capable of sensing the force applied to the finger tip and capable of using this signal to control the finger tip force to a desired force set point which may vary as a function of finger position.

Still another object of the invention is a force, texture, pressure and temperature feedback system which may be employed in many different applications, such as virtual environments, telemanipulation and interactive 3D graphics and Computer Aided Design (CAD).

A feature of the invention is the use of a flexible housing which may comprise one or more concentric flexible casings which guide a force-transmitting flexible elongated element such as a flexible, low friction/stiction, high modulus of elasticity thread or a shape memory alloy wire which serves as a tendon and is used in tension to apply force to a sensing body part or to actuate texture simulating elements.

Another feature of the invention is the use of a flexible housing which may comprise one or more concentric inelastic tubes to guide a force transmitting flexible elongated element such as pneumatic or hydraulic fluid to a sensing body part to be used by a force applicator to apply force to the sensing body part.

Still another feature of the invention is the use of force actuators to generate force which is transmitted to the sensing body part via flexible tendon cables, or pneumatic or hydraulic tubes, and used by a force applicator to apply force to the sensing body part.

Yet another feature of the invention is the use of force or displacement actuators to generate displacement which is transmitted to a sensing body part via flexible tendon cables, or pneumatic or hydraulic tubes, and used by a texture simulator to simulate textures on the sensing body part.

Yet another feature of the invention is the use of a support to which the flexible tendon cables or tubes are secured. The support may be a reinforced wrist-strap when the sensing body part is part of the hand.

Another feature of the invention is the use of a pressure, temperature, tension and/or force sensor to measure the pressure, temperature and/or force applied to the sensing body part.

One embodiment of the invention presents, for the first time, the use of a glove incorporating not only sensors which provide analog values representing finger and overall hand motion, but also true force feedback to the wearer's finger tips relating the amount of force a corresponding graphic (or actual) device is applying to a given virtual (or telemanipulated) object. The invention also relates to a means whereby simulated texture and edge orientation, as well as temperature and pressure may be presented to a user.

The invention, which senses one or more body part positions and provides force and texture feedback to one or more body parts, permits a relatively "natural" method of computer interaction. The subject device provides in a single unit: (1) controlling body part position-sensing means employing a plurality of signal producing means associated with individual movable controlling body parts, where the signal is related to controlling body part position, with the individual signals analyzed to define a composite signal. The signal producing means may be anything which provides body part position and/or orientation, including strain gage, electromagnetic, ultrasonic, piezoelectric, hall effect, infrared emitter/detector pair, encoder/potentiometer, laser scanning or other optical position (and/or orientation) sensors; (2) force-applying means which may be anything which provides force information to a sensing body part; and (3) force-sensing means which may be anything which provides a force measurement signal; and (4) textureapplying means (e.g., an array of texture elements) which may be anything which provides surface pattern (e.g., texture) information to a sensing body part; and (5) force-generating means which may be any actuator which generates a force (or displacement), including electrical, electromagnetic, electromechanical, pneumatic, hydraulic, piezoelectric, shape memory alloy (e.g., Nickel/Titanium alloys), vapor pressure actuators; and (6) force-transmitting means (e.g., a flexible, inelastic tendon guided by a flexible, incompressible housing, or an incompressible fluid guided by an inelastic housing) which may be anything which transmits a force signal from a force-generating means to an applying means (e.g., a force-applying means or a texture-applying means); and (7) signal collection and producing means (e.g., a processor or computer) which may be anything which collects signals (e.g., from the position-sensing and/or force-sensing means) and produces signals (e.g., for the force-applying and/or texture-applying means); and (8) support structure (including clips, straps, clamps, guides, pockets, material, etc.) used to support the body part sensing means, the force-applying means, the texture-applying means, the force-generating means, the force-transmitting means and the signal collection and producing means.

The signal associated with the controlling body part position-sensing means may be coordinated with the force applied to a sensing body part and also with the texture applied to a sensing body part. For example, the signal produced by the controlling body part position-sensing means may be used by a signal collection and producing means to manipulate a multi-articulated computer generated interactive entity in a virtual environment. The force-applying means may apply force to a sensing body part in relation to the interaction between the interactive entity and a component of the virtual environment. In addition, the texture-applying means may be associated with a surface pattern informative signal and apply a texture to a sensing body part to further enhance the sensation of reality in relation to the interaction of the entity and a component of the virtual environment.

A particular application for the invention is to sense and provide force and texture feedback to the hand. A useful embodiment for the invention when used for the hand is a "feedback glove." The feedback glove embodiment is comprised of means for measuring position and orientation of the hand, means for measuring individual joint angles, means for applying force to various parts of the hand, means for sensing the applied force, and means for applying selected textures to various parts of the hand. Many of the specific descriptions of the invention will be centered around the feedback glove, however, the sensing and structures described for the glove may be easily translated to other body parts (e.g., arms, legs, feet, head, neck, waist, etc.).

In a preferred embodiment of the feedback glove, the means for providing position and orientation of the hand is a Polhemus™ electromagnetic position sensor. The individual joint angle sensing means is comprised of two long flexible strain gages mounted back to back. The strain gage assemblies reside in guiding pockets sewn over each joint. When a joint is flexed, one of the strain gages of the corresponding pair of gages is in tension, while the other strain gage is in compression. Each pair of two strain gages comprise the two legs of a half bridge of a common Wheatstone bridge configuration. An analog multiplexer is used to select which of the half bridge voltages is to be sampled by an analog-to-digital converter. The maximum strain experienced by each gage is adjusted by varying the thickness and elastic modulus of the backing to which the gages are mounted. The backing is selected to maximize the signal output without significantly reducing the fatigue life of a gage. These joint angle strain gage sensors are disclosed in the Kramer et. al. U.S. Pat. No. 5,047,952 and are incorporated herein by reference.

The means for applying force to parts of the hand is comprised of a means (e.g., an electric motor) for generating a desired force, a means (e.g., a flexible tendon/casing assembly) for transmitting the generated force to a force-applying means, and a means (e.g., a force-applying platform) for transferring the force to a specific part of the hand (e.g., the finger tip). The feedback glove may also comprise a means (e.g., a force-sensing platform or load cell) for measuring the applied force. The means for applying texture to parts of the hand is comprised of a means (e.g., an electromechanical solenoid) for generating a desired displacement, a means (e.g., a flexible tendon/casing assembly) for transmitting the generated displacement to the hand, and a means (e.g., an array of texture elements) for applying a surface pattern to a specific part of the hand (e.g., the finger tip). The embodiment includes structure which supports both ends of the tendons and casings, and also supports the force and texture-applying means.

The force feedback glove, which embodies joint angle sensors and also the force and texture feedback apparatus, overcomes many of the problems of joint sensing devices which do not embody force and texture feedback. The feedback glove simulates contact and grasping information in a "natural" manner to a user and facilitates many tasks, such as those arising in interactive 3-D graphics and telerobotics. The feedback glove may be used to feedback texture information from "virtual" objects in a virtual environment or from distal "real" objects when used in telerobotic applications.

When used with appropriate animation and control software, the feedback glove provides joint angle sensing and sufficient tactile feedback for a user to control an interactive entity, such as a computer generated graphic representation of his hand to reliably grasp a virtual object, such as a cup, or any object which appears as a graphic model on a display device. Some virtual objects are programmed to demonstrate physical properties similar to real objects, such as weight, contour, stiffness and texture. These, and other features, may be sensed and the virtual objects manipulated using the feedback glove. The force feedback incorporated into the glove relays the virtual grasping force information to the user, while a texture simulator allows the user to sense orientation and motion of edges simply by "touching" virtual objects with his own computer simulated virtual fingers.

The feedback glove, which provides joint angle sensing and force and texture feedback, may also be used for telerobotics. For this application, the feedback glove provides joint angle information which is used to control an interactive entity, such as a robot manipulator, to grasp a distal real object. The force and texture feedback of the glove provide the user with the actual gripping force and the object contours sensed by the robot's gripper, so the real object may be reliably grasped and manipulated without dropping or crushing.

A glove using force feedback may also be programmed to teach finger dexterity, finger timing and even the motions necessary to learn some musical instruments. For example, if the user were learning the piano, as fingers are flexed, the user would receive finger tip pressure form virtual keys signifying to the user that he had pressed the key. Tendons similar to those positioned on the dorsal side of the fingers to restrict finger flexure may also be placed on the palm side of the hand. These palm-side tendons may be used to force the fingers into the desired flexed positions or to restrict the fingers from extending. These tendons would be used in the case when the user wanted to be "taught" to play the piano and wanted his fingers to be properly positioned and flexed for him at the proper times. The idea of this example may be extended from a virtual piano to other virtual instruments and even to other devices such as a virtual typewriter. The feedback glove could be used to teach someone to type, and when learned, to allow the user to generate text by "typing in the air."

More specifically, the invention is a man-machine system which, in addition to measuring actual human joint angles, provides two feedback sensations to the user. The first sensation is force. In a preferred embodiment, a small device is attached to the finger tip of a joint-angle sensing glove and holds a force-applying platform in juxtaposition to the finger tip. The force-applying platform is displaced from the finger tip (by about 4 mm) by a retractable means (e.g., a leaf spring) when unactivated, but is capable of quickly contacting the finger tip and applying a dynamically selectable force when activated. The sudden impact of the force-applying platform provides a sensation similar to that perceived when the actual finger tip contacts an object. Thereafter, the force-applying platform presses against the finger tip with a programmable force which may relate the amount of force that a virtual finger is pressing against a virtual object.

In a preferred embodiment, the force that is applied by the force-applying platform to the finger tip is transmitted from a force-generating actuator (a d.c. servo motor) via a high tensile strength, flexible tendon enclosed in a flexible, non-compressible tubular casing. The function of this assembly is similar to a bicycle brake cable. Other embodiments may employ force actuators based on electrical, electromagnetic, electromechanical, pneumatic, hydraulic, piezoelectric, shape memory alloy (e.g., Nickel/Titanium alloys), vapor pressure, or other suitable technologies. In choosing the appropriate actuator technology, various factors should be considered, such as speed of response, force output, size, weight, cost and power consumption.

One end of the tendon casing is secured near the force actuator and the other end is secured to a wristband near the feedback glove. As a tendon emerges from the end of the casing secured to the wristband, it is guided by sections of casing affixed to the glove material until the tendon reaches its designated final location. Tendons which are to provide a force to restrict the wearer from flexing a finger are guided from the wristband across the back side of the hand to the final location. A preferred embodiment has these tendons passing across the back of each finger and has them mechanically connected to the force-applying platform at the finger tip. In addition, a tendon may be terminated at any properly reinforced intermediate glove location.

As tension is increased, tendons which pass along the back side of a finger press against the joints and do not tend to pull the glove material away form the hand or fingers. The tension of the tendon restricts the joints over which the tendon passes from flexing in a direction which attempts to extend the tendon further.

To provide a force to restrict the wearer from extending a finger or to actually drive a finger into a flexed position, tendons are guided across the palm side of the glove by sections of casing. In a preferred embodiment, these tendons are guided to the finger tip where they are ultimately secured to a force-applying platform, but they may also terminate at properly reinforced intermediate positions. Unlike the case where the tendons are guided along the back-side of the hand, when the tendons which are guided along the palm-side of the hand are in tension, they tend to pull the casing sections (and hence the glove material) away form the hand. Although not necessary, if it is desired to guide these tendons along the surface of the palm and fingers as they pass from where the casings are secured to the wristband to their final designated locations, the glove must be appropriately reinforced between each joint.

Where the tendons are routed and where they are ultimately secured to the glove will determine the forces applied to the hand by the tendon. Forces and torques applied to parts of the hand by a single tendon may not be controlled independently. Only the force applied to one part of the hand or the torque applied by the tendon to an individual joint may be controlled. In a preferred embodiment, the tendons are fastened to the force-applying platforms at the finger tips, and the forces at the finger tips are measured and controlled, not the torques applied to the joints. To isolate the force and independently restrict motion of a single intermediate joint, a separate tendon is used. Its casing is secured just prior to the joint, and the tendon is fastened to a force-applying platform just beyond the joint. As previously mentioned, the glove is properly reinforced near the joint so the glove material doesn't unduly stretch under the force of the tendon.

When force is initially applied by a force actuator, the force will appear between the wristband and the intended finger. Therefore, the wristband will tend to move towards the finger as the "slack" in the skin on the wrist is taken up. The tendency for this relative motion can be reduced by incorporating a means which initially takes up the slack in this skin. Once this slack is taken up, the wristband will stop moving, and the finger will experience the full tendon force (except for frictional losses). If the slack in the wrist skin is not initially taken up, to provide a realistic contact sensation, the force actuator must have sufficiently high bandwidth such that this slack take-up time is insignificant when compared to the bandwidth of finger motion.

In a preferred embodiment, the actual force at the finger tip is sensed and fed back to a servo control system. The control system controls the output of the force actuator such that the force applied to the finger tip follows a desired force profile regardless of the undesirable compliance of the skin on the wrist. The force profile for any finger is a function which produces a desired force set point for any given finger and hand position. That is, as either the finger or hand changes position, the force applied to the fingers varies accordingly. For example, a force profile may be generated which simulates the force sensation of a push button switch that gradually increases its opposing force as the button is depressed until it reaches its toggle point, clicks, and releases most of its resistive force.

In addition to providing object contact and force information, the invention describes a means whereby object textures and edge orientations may be perceived. For one embodiment, the previously described finger tip force applicator may be modified to include an array of small stimulators, called texture elements. These elements produce a surface pattern (e.g., a simulated texture) in addition to providing force feedback. Each texture element may be individually selected. The texture element may be a small pin which extends when selected and the amount of its extension may be programmed. The texture element may also be a pair of electrodes, and tactile sensation produced via electrocutaneous stimulation.

In a preferred embodiment, the texture elements are driven by a texture displacement actuator. A flexible bundle of force feedback and texture simulating tendons connect the glove to both the force and texture actuators. The type of displacement actuator for a texture element may vary. A particular embodiment may employ binary or linear displacement actuators and the actuators may be based on electrical, electromagnetic, electromechanical, pneumatic, hydraulic, piezoelectric, shape memory alloy, vapor pressure and other suitable technologies. In choosing the appropriate actuator technology, various factors should be considered, such as speed of response, force output, size, weight, cost and power consumption. If pneumatics or hydraulics is used, a hermetically sealed flexible tubing assembly is used to connect the texture actuator to the texture element. Otherwise, the connection may employ a cabling means comprised of a tendon inside a casing, similar to that used to transmit the force from the force actuator to the force applicator.

If a binary actuator (e.g., a two-state solenoid) is used, then the texture element will either be fully extended or fully retracted. If a linear actuator is chosen (e.g., a d.c. servo motor) then the extension of the texture element may be continuously varied. The force with which the texture is presented to the finger tip is determined by the force actuator. The pattern of the texture array may be varied with time and reflect changes in the position of the joints or hand. For example, by dynamically varying the texture array, a user may perceive his virtual finger moving over various (e.g., smooth/rough) virtual surfaces. Using the time varying texture array, a user may also determine the edge orientation of a virtual or telemanipulated object.

BRIEF DESCRIPTION OF THE DRAWINGS

FIG. 1b is a cross-section for the perspective view of FIG. 1a.

FIGS. 8a–8m show various texture simulator embodiments.

FIGS. 11a–11d show a force applicator embodiment which employs a load cell to sense force applied to the finger tip.

FIGS. 12a and 12b show a force platform capable of pivoting to make the contact pressure between the platform and the finger tip uniform.

FIG. 13 is a side view of a force-applying platform where the pressure distribution may be modified by adjusting tendon tensions differentially.

FIGS. 14a and 14b show the side and plan views of an embodiment where the force-applying platform is capable of pivoting in any direction and thus can move the location of the centroid of pressure.

FIG. 15 is a side view of an embodiment showing how the tension in the tendon may be measured prior to the platform contacting the finger tip.

FIGS. 16a and 16b are side views of two more methods to measure tendon tension.

FIG. 25a employs only revolute joints whereas FIG. 25b employs both revolute and prismatic joints.

DETAILED DESCRIPTION OF ILLUSTRATIVE EMBODIMENTS

Figure 1A:
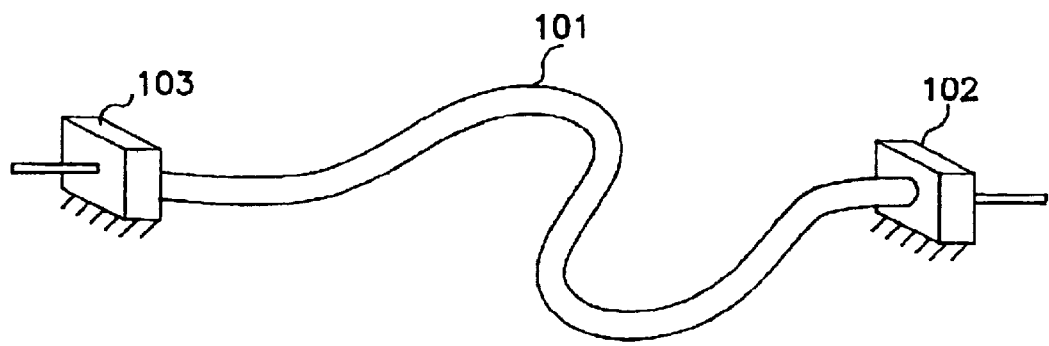
FIG. 1a is a perspective view of a tendon/casing assembly.
Figure 1B:
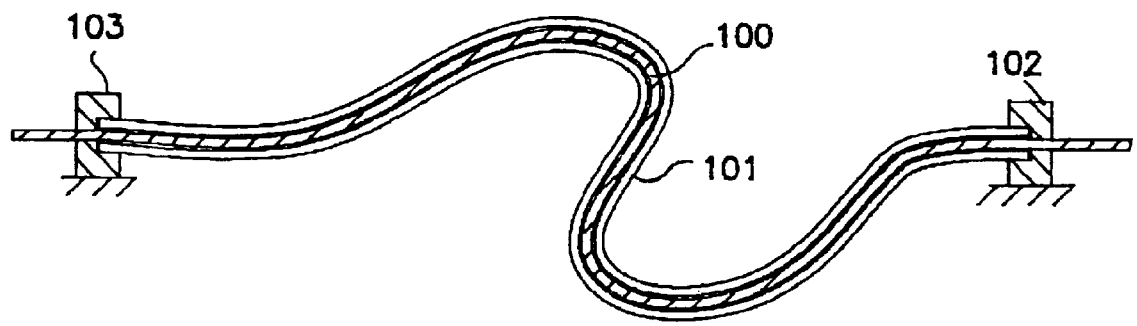

FIGS. 1a and 1b show how the force generated by a force actuator may be transmitted to a chosen location. More specifically, FIG. 1a shows a perspective view of a tendon assembly, and FIG. 1b shows a cross-section view. The tendon assembly is comprised of a low friction, high modulus of elasticity and high tensile strength, flexible tendon cable 100 (e.g., Dacron™ 20 lb. test fishing line or Kevlar™ thread) inside an assembly employing one or more concentric flexible, low-compressibility tubular casings 101 (e.g, Teflon™ tubing). One end 102 of the casing assembly is secured near the force actuator and the other end 103 of the casing is secured near the location where the force is to be applied (e.g., for a feedback glove, the casing may be secured to the wristband, and the force applied to the finger tip). By using a plurality of concentric casings (e.g., a #20 Teflon tube inside a #14 tube) rather than simply increasing the thickness of the wall of a single casing, the resulting tendon casing is more flexible (since the casings may slide relative to each other) and still produces an overall compressive strength nearly equal to that of a single casing of equivalent wall thickness.

Figure 2A:
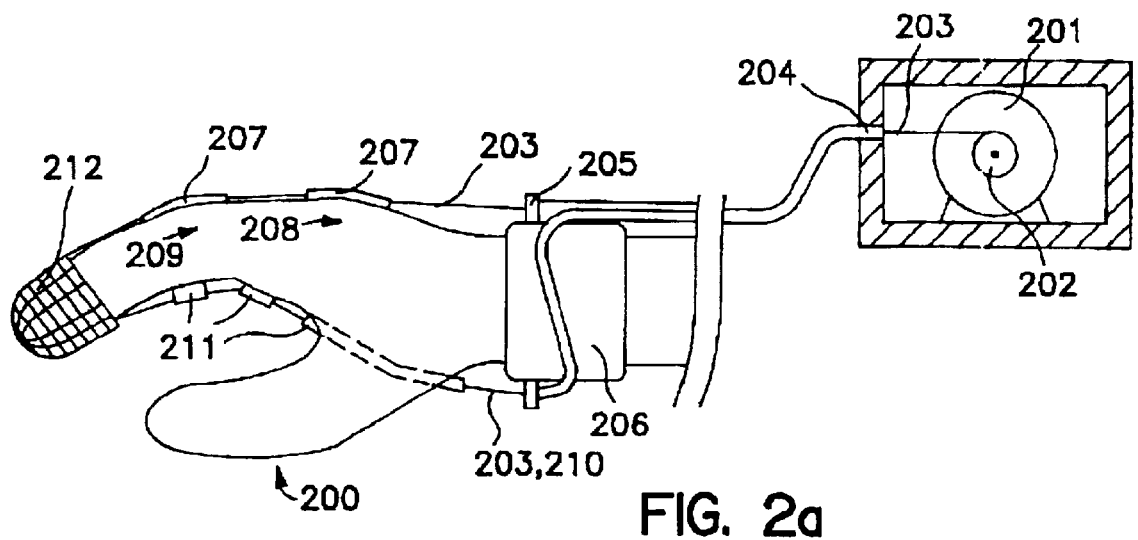
FIG. 2a is the side view of an embodiment of the invention showing the force-transmitting tendon assembly affixed to a glove.

FIG. 2a is a side view of a force feedback tendon assembly affixed to a glove 200. In this embodiment, each tendon force is generated by a d.c servo motor 201. The motor is driven by a current amplifier so that a motor torque is produced which is proportional to the amplifier current. This torque is converted to a tendon force by the tendon pulley 202 on which the tendon cable 203 is wound. By securing one end 204 of the tendon casing near the motor and the other end 205 to the glove's reinforced wristband 206, the tendon force produced by the motor may be transmitted to the glove. In a preferred embodiment of the invention, the wristband is comprised of a sturdy, reinforced strap with Velcro™ backing wrapped around a thin, rubber (e.g., polyurethane) intermediate layer. The rubber layer provides a comfortable interface between the reinforcing strap and the user's wrist. The strap is made from a heavy-duty thread (e.g., canvas) which is woven to allow it to be flexed around a wrist, but to otherwise provide a sturdy support. In general, the wristband may be manufactured from a variety of materials such as foam padded injection molded plastic. The wristband may be manufactured as part of the glove or made as a separate unit.

The tendon cable passes through a series of tendon guides 207 as it extends beyond the point where the casing is secured to the wristband on its way to the finger tip force applicator. In one embodiment, the tendon guides for the back side of the hand are made from flexible, but incompressible casing (e.g., Teflon tubing) and fastened over the metacarpophalangeal (MP) 208 and proximal interphalangeal (PIP) 209 joints. These guides prevent the tendons from moving laterally and slipping off the sides of the joints as the knuckles protrude during flexure. In the embodiment where the glove has tendons 210 on the palm side of the hand, and it is desired to have the tendons remain close to the hand when they are in tension, tendon guides 211 are located between the MP and PIP joints and also across the palm to keep the tendon from pulling away from the glove. The glove is also reinforced in a variety of places to prevent the glove from being pulled away from the hand by the tendon guides. Tendon guides may be affixed to the glove by such means as sewing or gluing, or the casings may be molded directly onto/into the glove.

The finger tip force applicator 212 (shown generically by the cross-hatched portion of the finger tip) applies both back-side and palm-side tendon forces directly to the finger tip. Also on the finger tip force applicator assembly is a force transducer for each tendon which senses the actual force applied to the finger tip. These force signals are fed back to the motor force control system which makes appropriate adjustments such that the desired force profile is perceived by the user.

Figure 2B:
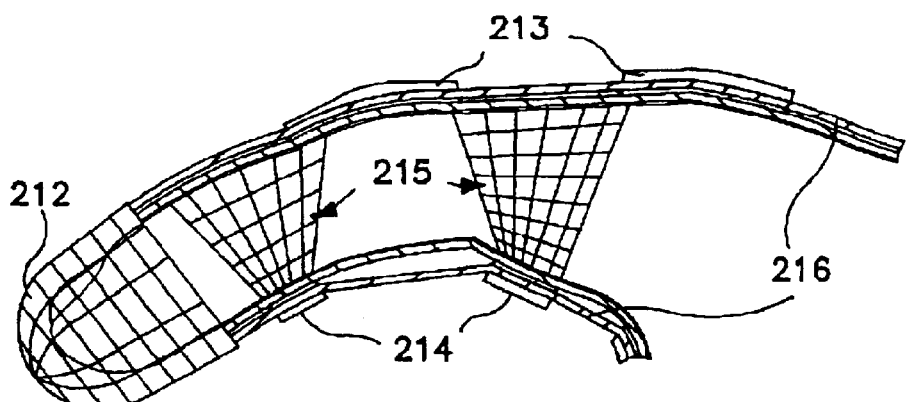
FIG. 2b is a cross-section view of an embodiment of the invention which shows tendons affixed, via tendon guides, to material covering a finger: one tendon to the back side and one tendon to the palm side of the finger.

FIG. 2b is a cross-section view of an embodiment of the invention showing force feedback tendons 216 passing through guides on both the back 213 and palm 214 sides of a glove finger. Both tendons are attached to the force applicator at the finger tip. In a preferred embodiment, when the tendon guides are affixed to an elastic glove, only the palm-side tendon guides need reinforcement to ensure that they remain against the finger when the tendon is in tension. One way to accomplish the reinforcement is to fasten additional material 215 of low elasticity (eg., nylon, plastic, or metal) around the finger at the base of the tendon guide.

Figure 2C:
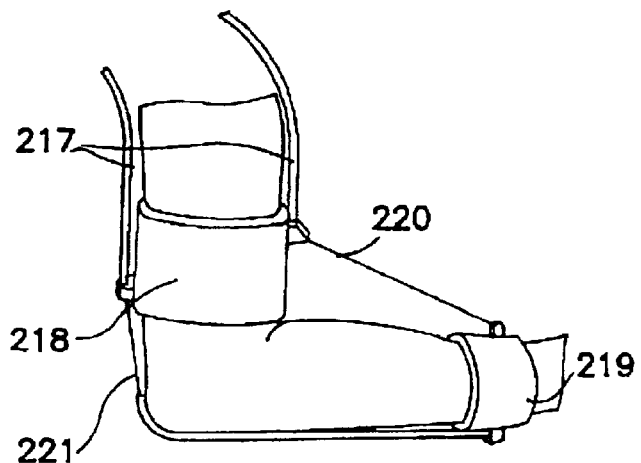
FIG. 2c is an embodiment of the invention which shows tendons affixed to provide force feedback to other body parts (e.g., the arm).

FIG. 2c shows a force feedback tendon/casing assembly applied to the arm. Casings 217 may be secured to a reinforced strap 218 worn around the biceps. The strap is similar in construction to the wristband previously described and also employed here. Both the tendons shown exit the casings on the biceps and are affixed to the wristband 219. One tendon 220 provides a force which restricts the elbow from extending while the other tendon 221 provides a force which restricts the elbow from retracting. Assemblies similar to the ones shown in FIGS. 2a–2c may be incorporated into a "feedback body suit," i.e., a suit which covers all, or portions of the body, and which can apply force and texture information to various parts of the body.

Figure 3:
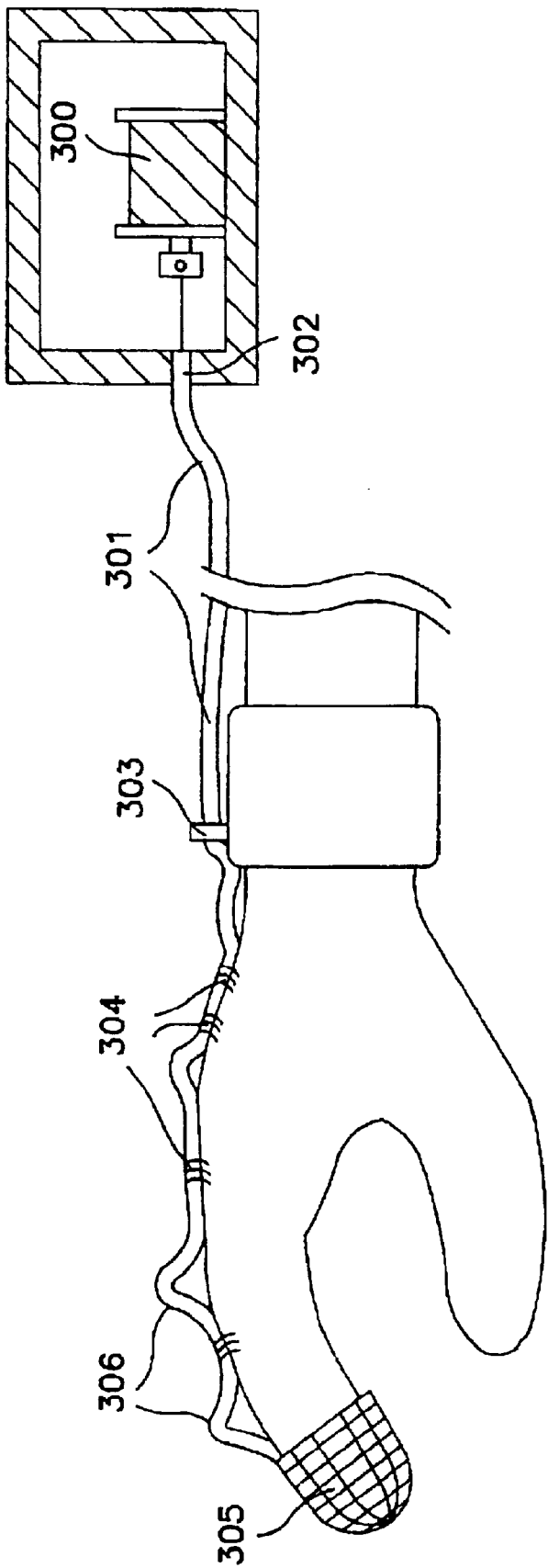
FIG. 3 is the side view of an embodiment of the invention showing the texture simulating tendon assembly affixed to a glove.

FIG. 3 is a side view of a texture simulating tendon assembly affixed to a glove. The tendon displacement in this embodiment is generated by a two-state electromechanical solenoid 300 and is transmitted to the finger tip via a tendon and casing assembly 301. The tendon assembly shown here is similar in function to the tendon assembly described earlier for FIGS. 1a and 1b, however, the diameter of both the tendon and casing may be smaller since the forces these texture tendons need to exert are less than the forces exerted by the force feedback tendons.

One end 302 of the tendon casing for the texture simulator is secured near the displacement actuator, and a point 303 near the other end of the casing is secured to the glove's reinforced wristband. After the casing is affixed to the wristband, it continues on and is fastened to the glove at various locations 304 between the joints on its way to its designated final location, which in this embodiment is the finger tip texture simulator 305. Casings may be affixed to the glove by such means as sewing or gluing, or the casings may be molded directly onto/into the glove. In the embodiment shown, there is slack 306 in the casing between points where it is affixed to the glove to allow for the tightening of the casing when the fingers are bent. The casings may also be guided along the sides of the fingers without allowing for slack since they won't be stressed when the fingers are bent.

Figure 4A:
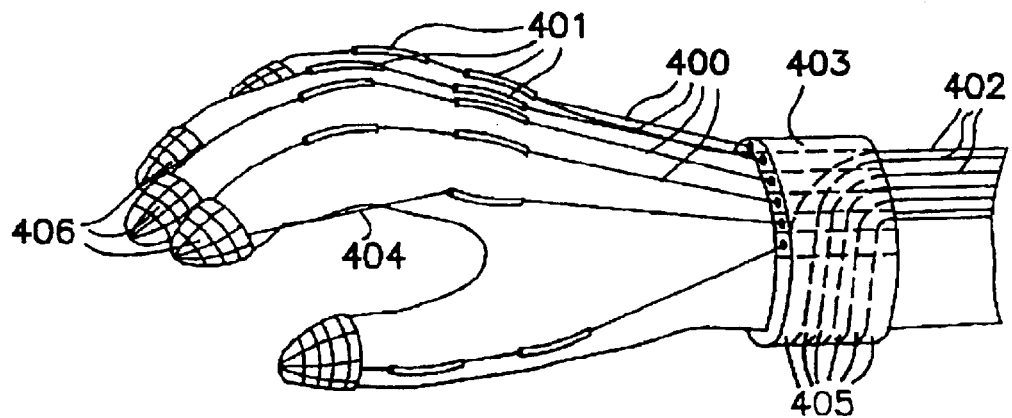
FIGS. 4a and 4b show an embodiment of the invention where force tendons are affixed, via tendon casings, to both the palm and back side of the finger tip of a glove. One end of the tendon casing is secured to a wrist portion of the glove, and the other end is fastened to the force applicator assembly on the finger tip.

FIG. 4a shows a plurality of force feedback tendons 400 and their guides 401. Although the texture feedback discussed in FIG. 3 may be used simultaneously with force feedback, the texture producing tendons have been omitted from this drawing for clarity. The tendon casings 402 are shown secured to the reinforced wristband 403. In this embodiment, there is one tendon on the back of each finger to control the force applied to the finger tip. In addition, the figure provides an example of an abduction force feedback tendon 404 on the thumb side of the index finger.

Force is imparted to each tendon from a force actuator. In the embodiment shown, forces are transmitted to the glove via a tendon assembly similar to FIGS. 1a and 1b. One end of the tendon casings is secured near the force actuator, and at the other end is fastened to the glove's reinforced wristband. Tendons 405 intended for the palm side of the glove extend around the wristband as shown. These tendons 400 intended for the back side of the hand emerge from the casing on the wristband and are guided along the back surface of the glove by sections of casing 401 until they reach the desired final location. In the embodiment shown the final tendon location is the finger tip force applicator 406.

Figure 4B:
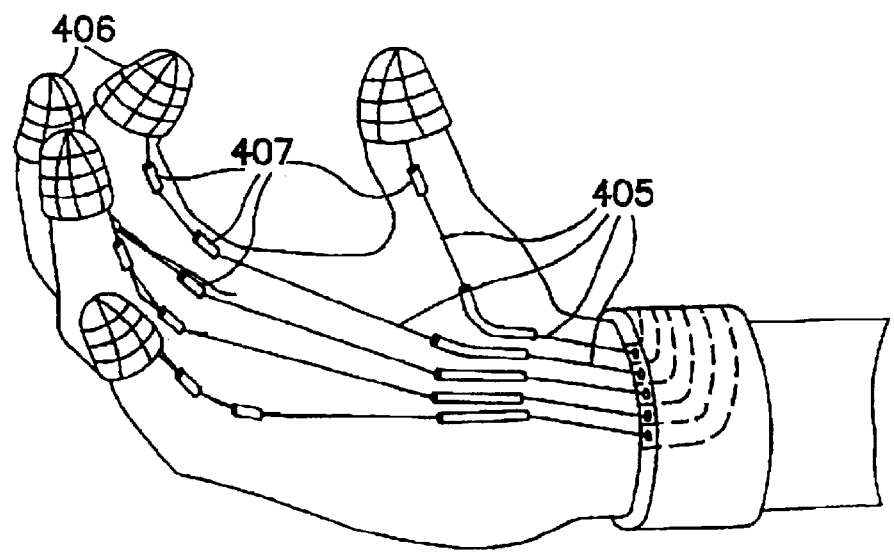

FIG. 4b shows a force feedback tendons 405 guided around the wristband to the palm side of a glove. The palm-side tendons then emerge from their casings on the wristband and are guided through sections of casing 407 on their way to the finger tip force applicator.

One useful yet unincumbering and inexpensive embodiment of the invention employs force feedback tendons only along the back of the hand to the tips of the thumb and index fingers, and employs texture elements only on the index finger tip. This "reduced" embodiment is in contrast to employing both force feedback and texture simulation to each joint of all five fingers. The reduced embodiment provides the wearer with sufficient force feedback information to grasp most virtual objects and also allows the wearer to sense virtual textures with the index finger. Although, employing force feedback to all joints on all fingers and texture simulation to all fingers tips will provide the wearer with a more realistic simulation of his virtual environment, the increase in realism may not outweigh the added cost and complexity of the system.

Figure 5A:
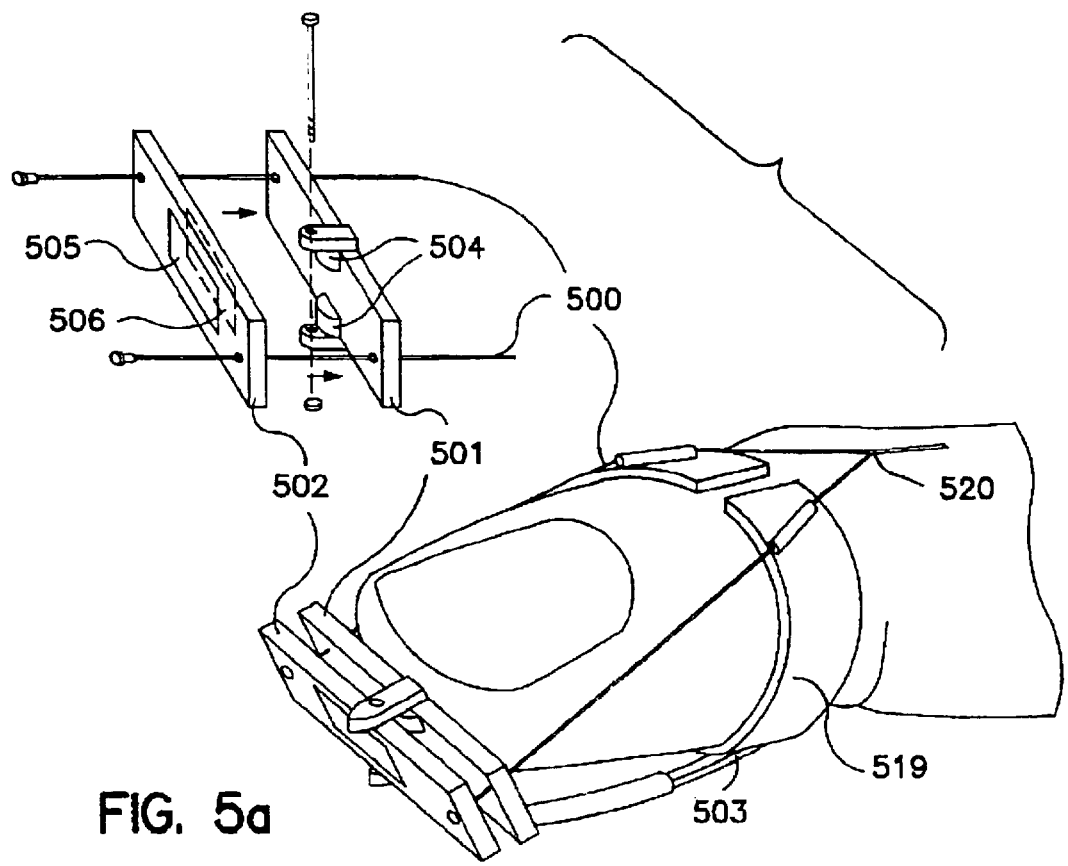
FIGS. 5a–5m, and FIGS. 6a–6c show various force applicator embodiments.
Figure 5B:
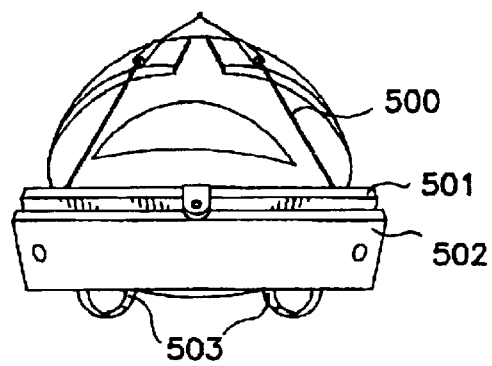
Figure 5C:
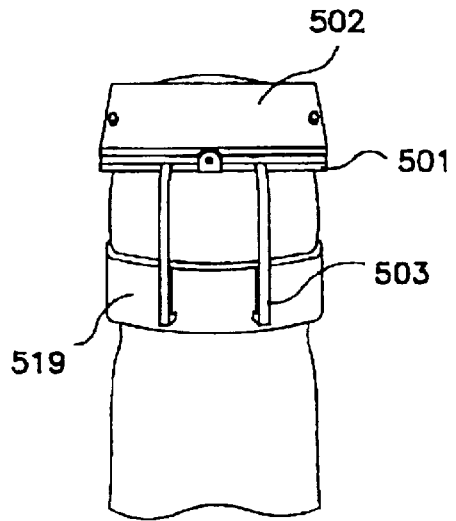
Figure 5D:
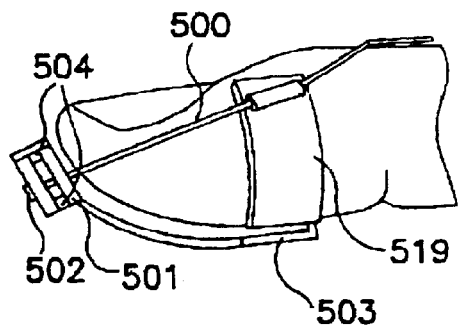
Figure 5E:
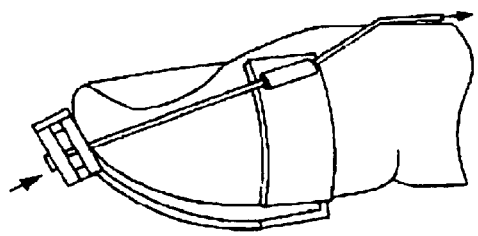
Figure 5F:
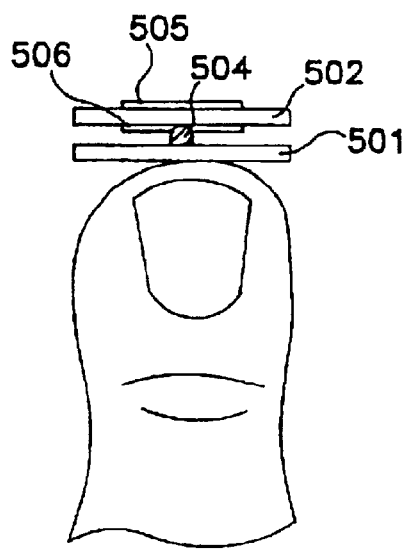

FIGS. 5a–5e shows a finger tip force feedback applicator which is comprised of a force-applying platform and a force-sensing platform. FIG. 5a is a perspective view, FIG. 5b is a front view, FIG. 5c is a bottom view, and FIGS. 5d and 5e are side views. Modifications may be made to this functional design without departing from the scope of the invention. The force feedback applicator may be manufactured directly into the glove material (as might be done if the glove were molded from a type of plastic). The applicator may also be affixed to the glove externally after both the applicator and glove are manufactured separately. The force applicator may also be a device which is simply clipped to the finger tip after the glove is put on.

In a preferred embodiment, a force tendon 500 is guided from the force actuator to the force feedback applicator, splits into two tendons, each tendon passing by the force-applying platform 501 (e.g., though holes), and mechanically connected to the ends of the force-sensing means, which is a force-sensing platform 502. The force feedback applicator structure 519 provides support for holding the force-sensing and force-applying platforms in juxtaposition to the finger tip. The force-sensing platform is forced via the force of the tendon towards the finger tip. The force-sensing platform presses against the force-applying platform which then contacts and applies force to the finger tip (FIG. 5e). When there is little or no force in the tendon, the force-applying platform is displaced from the finger tip by about 4 mm and is held away by a retractable means such as small springs (FIG. 5d). Leaf springs 503 are employed in the embodiment shown. By keeping the force-applying platform displaced from the finger tip in an unactivated position until force is applied, bandwidth requirements of the force actuator are reduced. For example, when the invention is used to provide feedback from a virtual environment and a virtual object is grasped, the force-applying platform assumes an activated position and contacts the finger tip with a non-zero relative velocity, as would a real object when contacting the finger tip. If the force-applying platform were always in contact with the finger tip, very large tendon velocities and accelerations would have to be generated to provide the same contact sensation to the user.

The force-sensing platform may be simply a strain gage beam which bends across a fulcrum 504 as tendon force is applied. The fulcrum shown in FIGS. 5a–5f is thin and concentrates the applied force over a small area such that the induced strain is easily measured by the two strain gages 505, 506 mounted differentially to either side of this force-sensing platform.

Figure 5G:
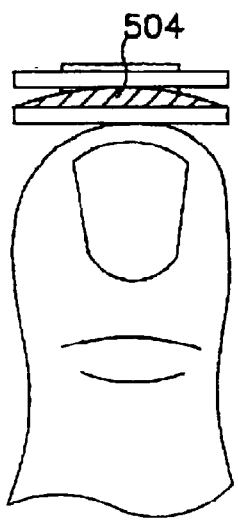

Alternative fulcrum designs are possible such as shown in FIG. 5g. By modifying the fulcrum shape and contour, various stress vs. tendon force profiles may be obtained. For example, the fulcrum design of FIG. 5g will provide a higher strain "gain" for low strains than the fulcrum of FIG. 5f, i.e., the detected strain will be large for small forces, but the strain gain will decrease as the force-sensing platform bends around the fulcrum. As the force-sensing platform bends around the fulcrum, the measured strain includes not only a component from bending but also includes a component from tension in the platform. By varying the contour, and thus the strain sensitivity of the force-sensing platform, small forces are detected with fine resolution, but the sensor will not saturate as quickly for higher strains. Further modifications of the fulcrum and platform geometries produce additional strain vs. force profiles.

As shown in FIGS. 5a–5g, when tension is applied to the tendon, strain gage 505 is in tension and strain gage 506 is in compression. Both strain gages are active and cover the area of the platform experiencing strain. Together, the two strain gages form a half bridge for a common Wheatstone bridge circuit which provides temperature compensation. The fulcrum and all other parts of the force-applying platform that touch the force-sensing platform are made from a thermally insulating material to insulate the strain gages on the force-sensing platform from the temperature fluctuations of the finger.

Figure 5H:
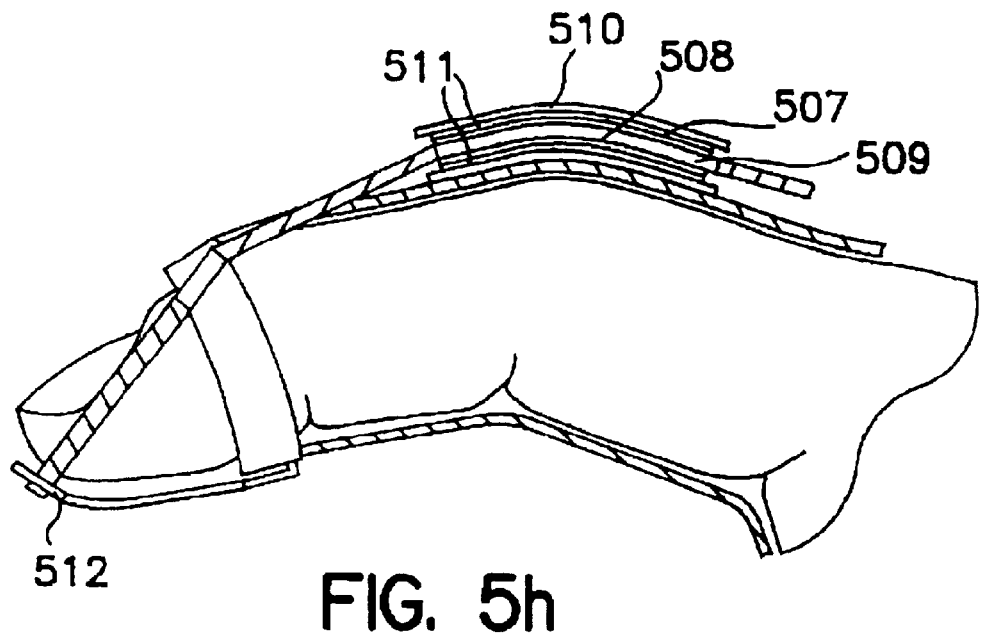

FIG. 5h shows a force-sensing means, comprised of two strain gages 507, 508, mounted to opposite sides of a flexible stress-sensing element 509 which is placed in series with the tendon and experiences a tensile force related to the tendon force. The stress-sensing element may be a flattened portion of the tendon itself. This stress-sensing element may be used to measure the tendon tension and/or the joint angles. One strain gage 507 is mounted to the top side of the element, while the second strain gage 508 is mounted to the bottom side. In the embodiment shown, the stress-sensing element is used to measure both tendon tension and joint flexure. Therefore, the entire gage-element-gage "sandwich" is positioned in, and slides freely through, the casing guide 510, which has a rectangular cross-section in this region. Both gages are covered with a smooth, flexible encapsulation 511 (e.g., a type of plastic) which provides the surface that slides against the casing. The differential signal from the two gages is used to determine the joint angle, while the common mode signal from the same two gages provides a measure of the tendon tension. The stress-sensing element may be made from a non-flexible material and located between joints when only a measure of tendon tension is desired. The force in the tendon near the finger tip closely approximates the force applied by the force-applying platform to the finger tip. If the tendon tension is found using the stress-sensing element described here, the force-sensing platform previously described may be removed from the finger tip force applicator, and the mechanical design may be simplified to a single platform 512.

Figure 5I:
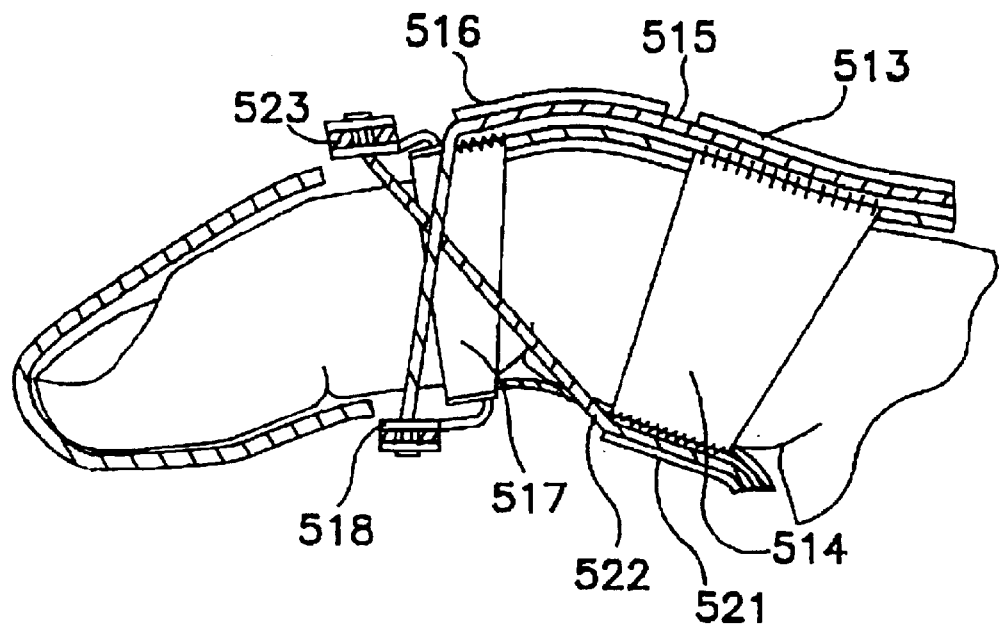

FIG. 5i shows how a force may be focused to restrict flexure of a single joint (e.g., the PIP joint as shown in this figure). The tendon casing 513 is secured to a first reinforced section 514 of the glove just prior to the selected joint. The tendon 515 exits the main casing and is guided over the joint by a section of casing 516, which is fastened to a second reinforced section 517 of the glove. The tendon exits the casing and forks into two tendon parts (as is shown 520 for the finger tip force-applying platform of FIG. 5a). The two tendon parts pass around opposite sides of the finger and are affixed to opposite ends of the force-applying platform 518, which is secured to the second reinforced section of the glove. The platform assembly contacts and presses against the finger when the tendon 515 is in tension.

The same method of operation can be applied to restrict the joint from extending as was described above to restrict the joint from flexing. A second tendon casing 521 is affixed to the first reinforced section of the glove. A second tendon 522 emerges from the casing and forks into two tendon parts. The two tendon parts pass around opposite sides of the finger and are affixed to opposite ends of the force-applying platform 523. The platform assembly contacts and presses against the finger when the tendon 522 is in tension.

Figure 5J:
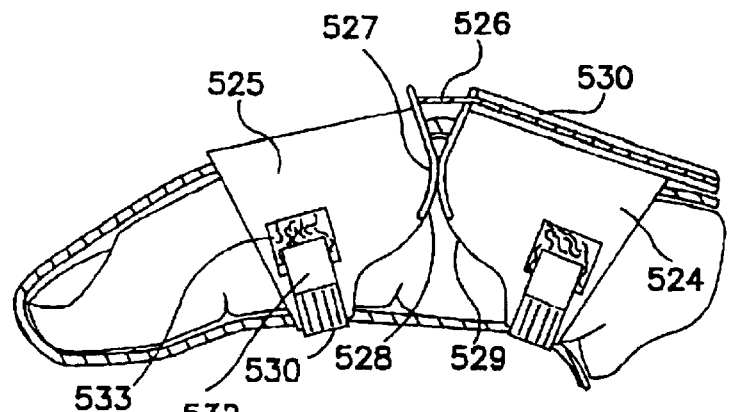

In the case where it is undesirable to reinforce the glove to support sections such as 514 and 517, FIG. 5j shows a way to provide force feedback to an individual joint of an unreinforced glove. If the glove of FIG. 5h were not reinforced near sections 514 and 517, then when tendon 515 was in tension, the two sections would be drawn towards each other. A possible solution would be to place a hinge between the sections to prevent them from simply sliding together. However, since the bend axis of a finger may translate and change orientation with bend angle, a single hinge would be uncomfortable for a glove wearer.

Figure 5K:
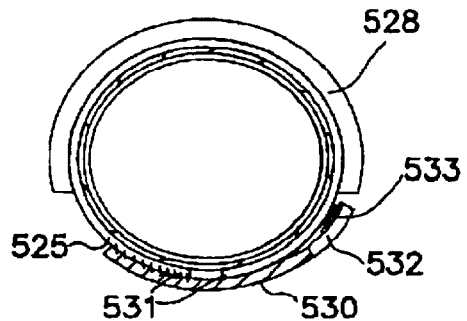
Figure 5L:
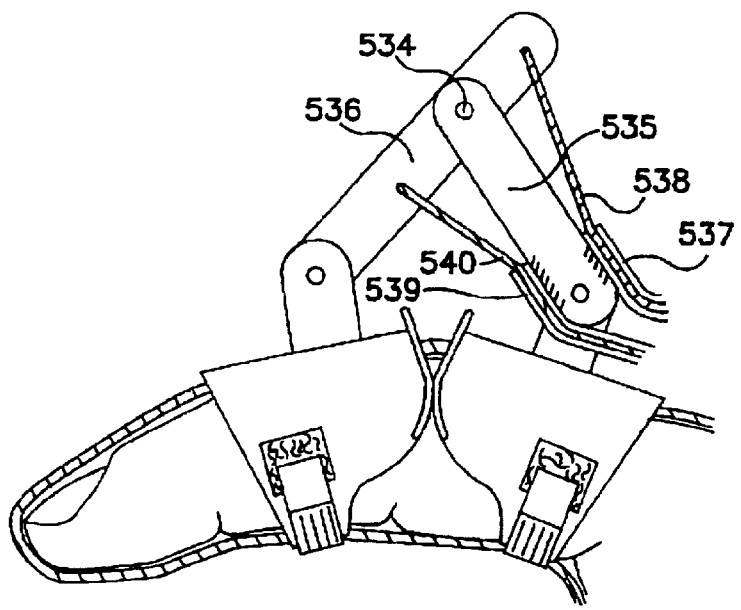
Figure 5M:
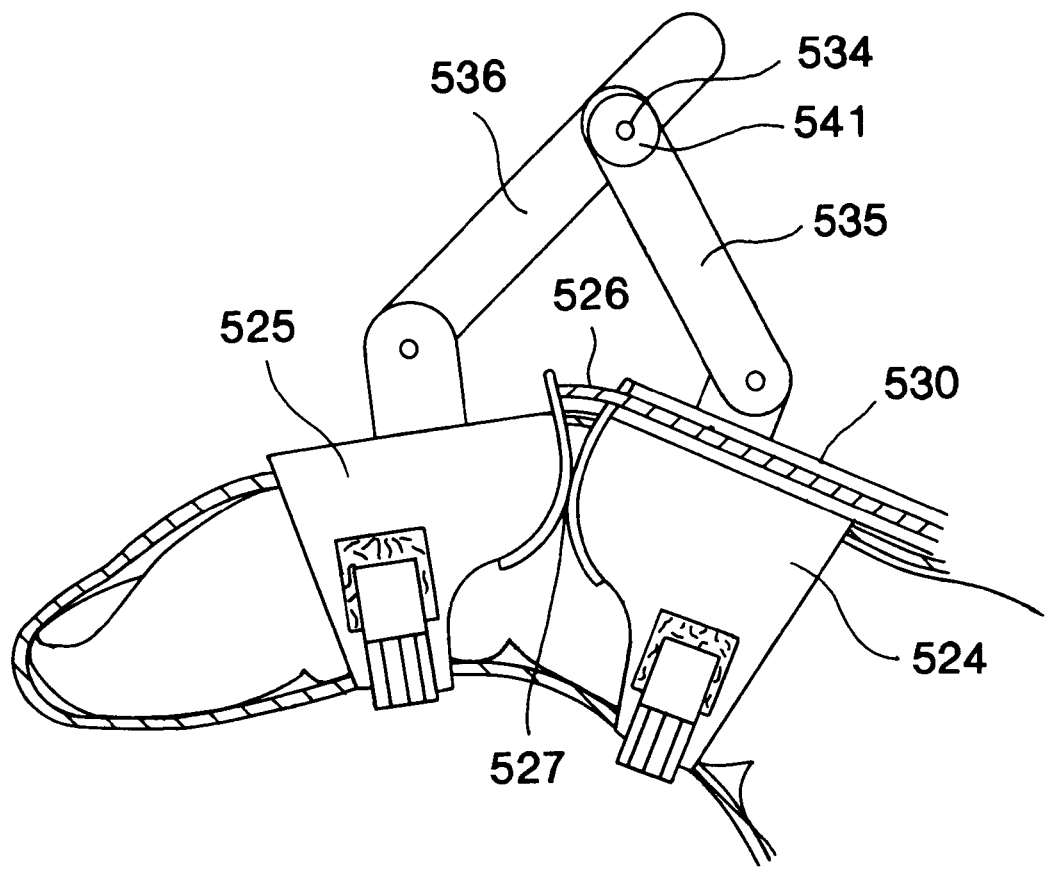

In FIG. 5m a device which is in part a composite of FIG. 5J and 5L is depicted. Sections 524 and 525 are in contact with each other and produce a pivot surface 527 when tendon 526 (emerging from casing 530) is in tension. As the tendon tension increases, the two sections press against each other and section 525 is forced to rotate clockwise, while section 524 rotates counterclockwise, each section rotating about the "moving" contact pivot point. A rotary goniometer 541 is attached to the linkage at the joint 534 between the two links 535 and 536. The value of the goniometer may be related to the joint angle of the knuckle.

A preferred alternative to the "fixed hinge" solution is shown in FIG. 5j, where sections 524 and 525 are in contact with each other and produce a pivot surface 527 when tendon 526 (emerging from casing 530) is in tension. The pivot surface is created by the two mating flaps 528 and 529, which each have a characteristic surface contour designed to follow the average knuckle axis during flexure. As the tendon tension increases, the two sections press against each other and section 525 is forced to rotate clockwise, while section 524 rotates counter clockwise, each section rotating about the "moving" contact pivot point. The two sections are able to slide axially relative to the finger so they may contact each other when tendon tension is applied, and also so the same surface contours for the two sections will accommodate a variety of different knuckles. The two flaps, in addition to possessing a contour, may also have mating surfaces, such as mating groves, to prevent one surface from sliding off the other surface.

To keep the sections secured to the fingers, the sections may be made from a solid, but elastic material (such as a plastic or spring metal), which is preformed to clip around the finger, as shown in FIG. 5j. The firm elastic strap 530 helps hold the two ends 531 of the clip together. One end of the elastic strap is permanently secured to one side of the dip, while the other end 532 of the strap is secured to the other side of the clip by Velcro™ 533. The elasticity of the dip, together with the elastic strap, hold the section firmly to the finger, but, since the clip and strap are elastic, they allow the finger diameter to expand when the finger is flexed.

In some instances, it may be preferred to have a linkage attached to the sections, such as is shown in FIG. 5l. For example, if a rotary goniometer (e.g., a potentiometer, an optical encoder, or a rotary Hall effect sensor) were attached to the linkage at the joint 534 between the two links 535 and 536, the value of the goniometer may be related to the joint angle of the knuckle. When the linkage is employed, the force feedback assembly of FIG. 5j may still be used, however, as shown in FIG. 5l, the tendons may also be affixed directly to the linkage. A first casing 537 is affixed to link 535 and tendon 538 is affixed to link 536. Similarly, a second casing 539 is affixed to link 535 and tendon 540 is affixed to link 536. When tendon 538 is in tension, link 536 is pulled to rotate clockwise, forcing the finger to extend. When tendon 540 is in tension, link 536 is pulled to rotate counter clockwise, forcing the finger to flex.

Note that in FIG. 5l, supporting sections similar to those used in FIG. 5j are shown. If the glove is appropriately reinforced, other support sections, such as shown in FIG. 5i, may be used. Also note that in FIGS. 5j–5l, force-applying platforms may be employed to focus the applied force to a particular region of the finger. In addition, for clarity, force feedback tendons for the palm-side of the hand are not shown in FIGS. 5j–5l, however, they may be employed in an obvious manner.

Figure 6A:
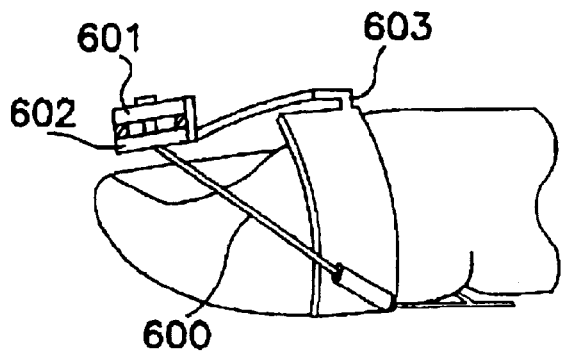
Figure 6B:
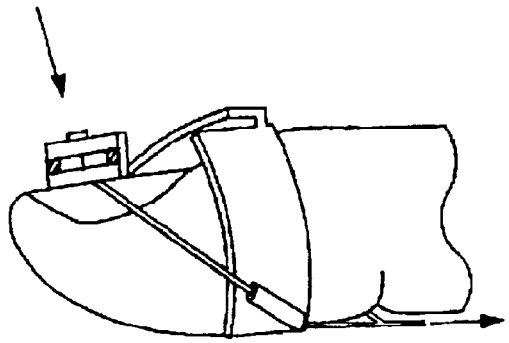
Figure 6C:
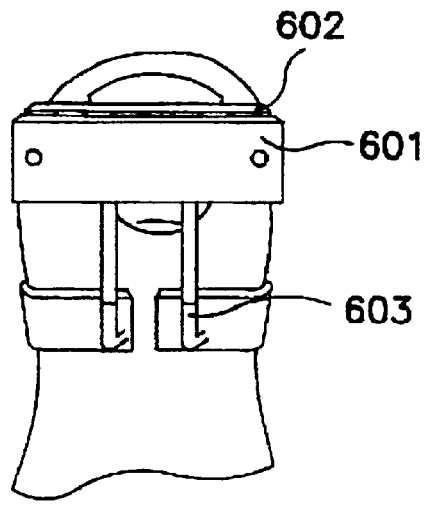

FIGS. 6a–6c show an embodiment of the force feedback applicator which produces force feedback from a tendon affixed to the palm side of the glove. This configuration provides a force which restricts the finger joints from extending and may also force them to flex. FIGS. 6a and 6b show side views, while FIG. 6c shows a top view. For clarity, only the apparatus specifically required for palm-side tendons is shown, but the force applicator may additionally include the apparatus shown in FIGS. 5a–5e. Tendon force is generated by an actuator and transmitted, as shown in FIGS. 1 and 2, to the force feedback applicator. As shown in FIG. 5a, the tendon 600 is guided past the force-applying platform 601 (e.g., through holes), and is affixed to the force-sensing platform 602. The force-sensing platform again has two strain gages connected differentially in a half bridge configuration. The force-applying platform is also as before and has a stress concentrating, thermally insulating fulcrum on the side opposite to the finger. The insulating fulcrum prevents heat conduction from the finger to the gages on the force-sensing platform. The force-applying platform is displaced above the finger nail by springs (FIG. 6a) and contacts the finger nail only when a force is applied to the tendon (FIG. 6b). In the embodiment shown the springs are leaf springs 603. The applied tendon force presses the force-sensing platform into the force-applying platform which then presses against the finger nail. As the force-sensing platform presses against the force-applying platform, the platform is bent around the fulcrum and produces a strain in the gages indicative of the force applied to the finger nail.

Figure 7B:
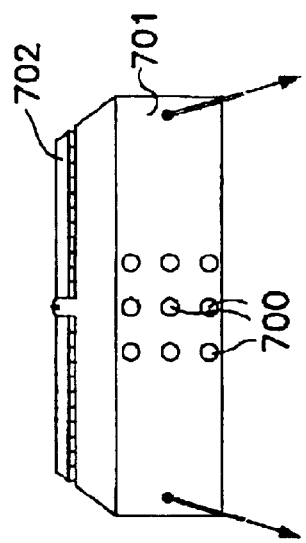
FIGS. 7a and 7b show the force applicator modified to simulate, in addition, texture information.
Figure 7A:
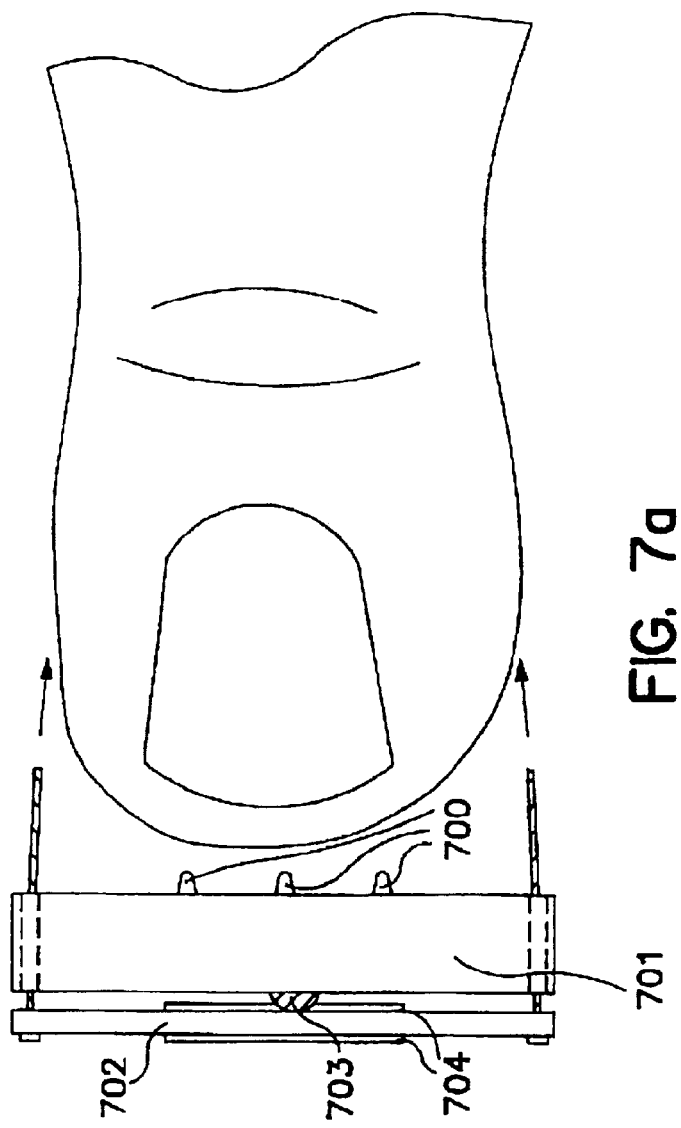

FIGS. 7a and 7b show an embodiment of a finger tip texture simulator. FIG. 7a shows the top view, while FIG. 7b shows a view looking at the the texture simulator from the finger tip. The particular embodiment shows a 3×3 texture array 700, where the texture elements are spaced on 3 mm centers and extend 1 mm when activated. Texture arrays employing various numbers of texture elements may be constructed. The texture array is contained within a modified force-applying platform 701 and held in juxtaposition to the finger tip by the supporting structure 519. As shown, this texture simulator assembly may also provide force feedback by including the same force-sensing platform 702, fulcrum 703, and strain gages 704 as described in FIGS. 5 and 6. In FIGS. 7a and 7b, the actuating mechanism for the texture elements is not shown.

Displacement may be delivered to the finger tip texture simulator from the corresponding actuator as previously described in FIG. 3 via a tendon cable/casing or tubing assembly, by electrical wires, or by pneumatic or hydraulic means. FIG. 8a is a cross-section view where a tendon 800 enters the finger tip texture simulator 801, and when actuated, pulls on the base of a corresponding spring-loaded texture element 802 to raise it. When raised, the texture element extends from within its enclosure and presses against the finger tip. When the tendon force is reduced, the spring 803 causes the element to retract back into the finger tip texture simulating enclosure. In all of FIGS. 8a–8m, the diagram on the left shows the unactivated state and the diagram on the right shows the activated state.

Figure 8B:
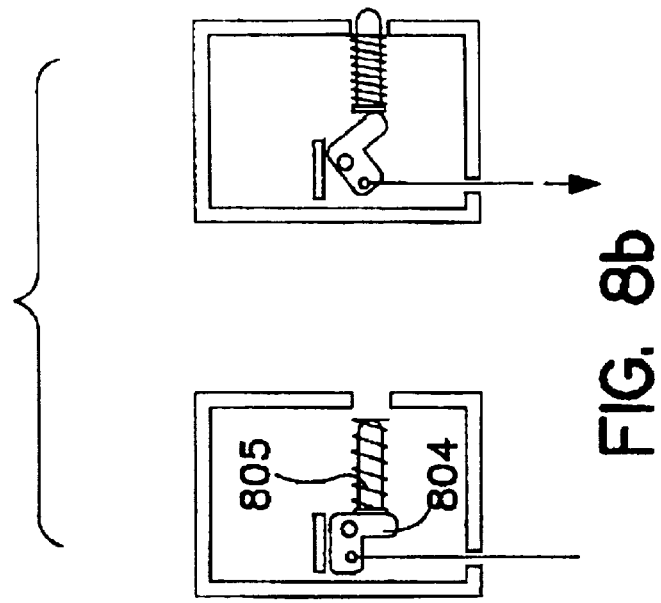
Figure 8A:
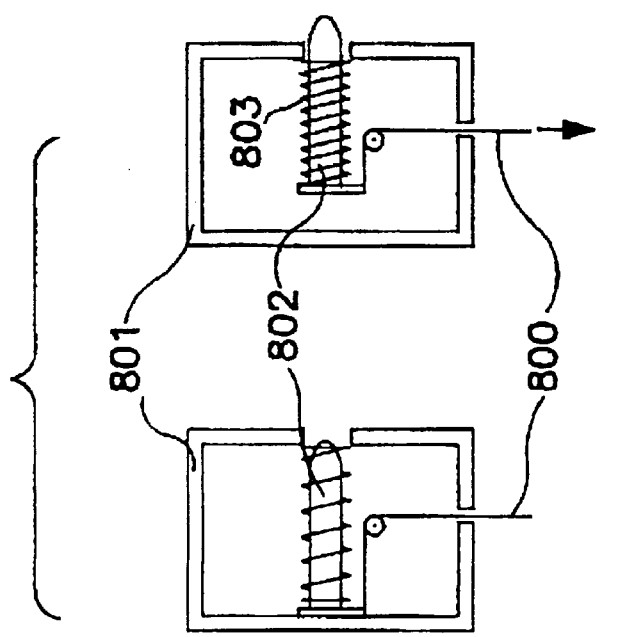

FIG. 8b is a cross-section view of a finger tip texture simulator where a tendon pulls on the L-shaped bracket 804, rotating it counter clockwise. As it rotates, the bracket pushes on the texture element which then extends from the finger tip texture simulator enclosure and presses against the finger tip. When tendon tension is removed, the spring 805 returns the texture element to its original, unextended position.

Figure 8D:
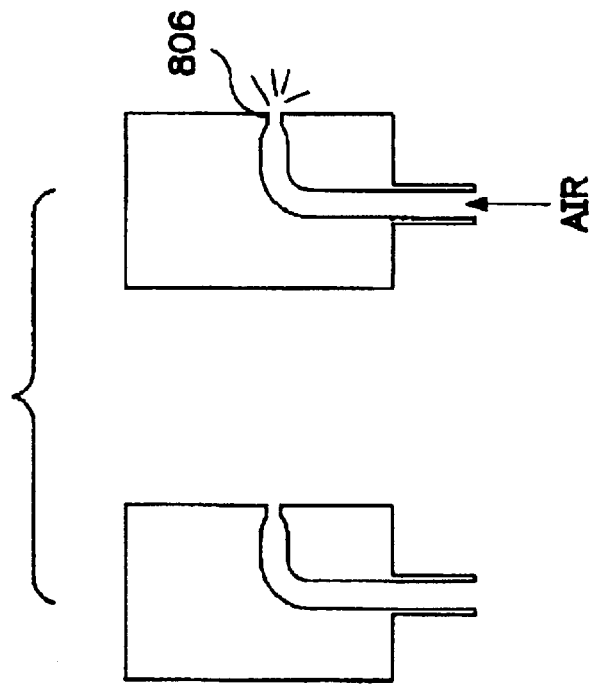
Figure 8C:
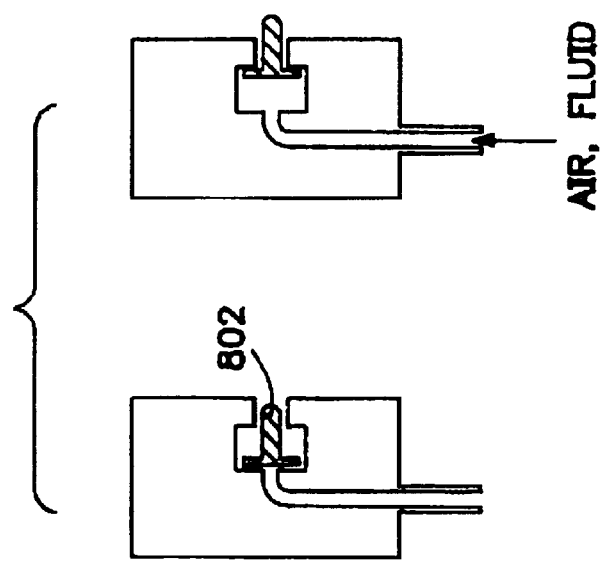

FIG. 8c is a cross-section view of a finger tip texture simulator when either pneumatics or hydraulics are employed. A positive pneumatic or hydraulic pressure extends the texture element and a negative pressure retracts it.

FIG. 8d is a cross-section view of a finger tip texture simulator where another type of pneumatic actuator is used. When actuated, air enters the device and exits through the nozzle 806. This focused air stream creates a tactile sensation on the finger tip.

Figure 8F:
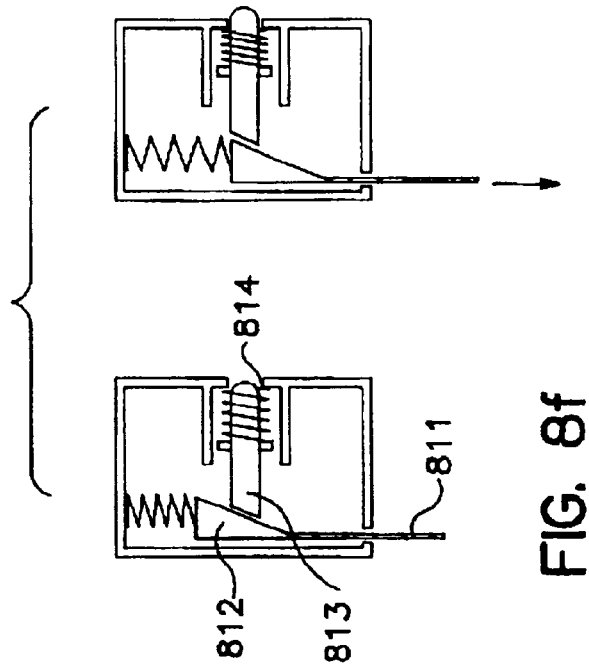
Figure 8E:
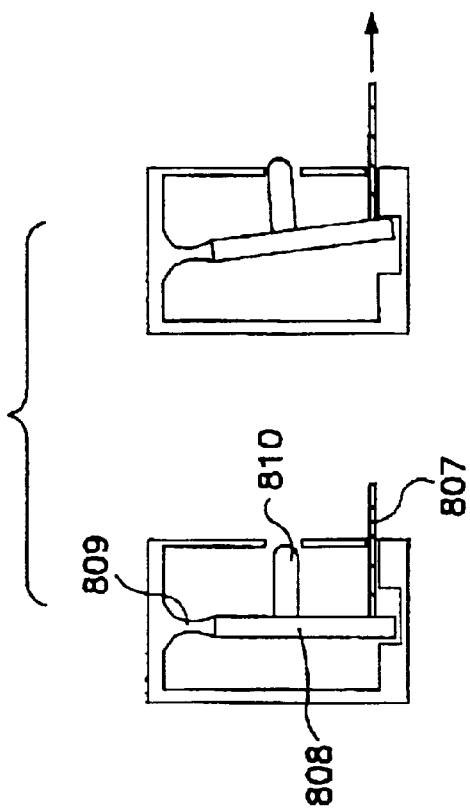

FIG. 8e is a cross-section view of a finger tip texture simulator where a tendon 807 pulls on the bar 808 causing it to pivot. The pivot may either be a hinge with a return spring or a living hinge 809 (as shown). A texture element 810 is attached to the bar which protrudes from the enclosure and presses against the finger tip when the bar pivots.

FIG. 8f is a cross-section view of a finger tip texture simulator where a tendon 811 pulls on a wedge 812 causing it to slide underneath and raise the texture element 813. When tendon force is released, the spring 814 returns the wedge to its initial position.

Figure 8H:
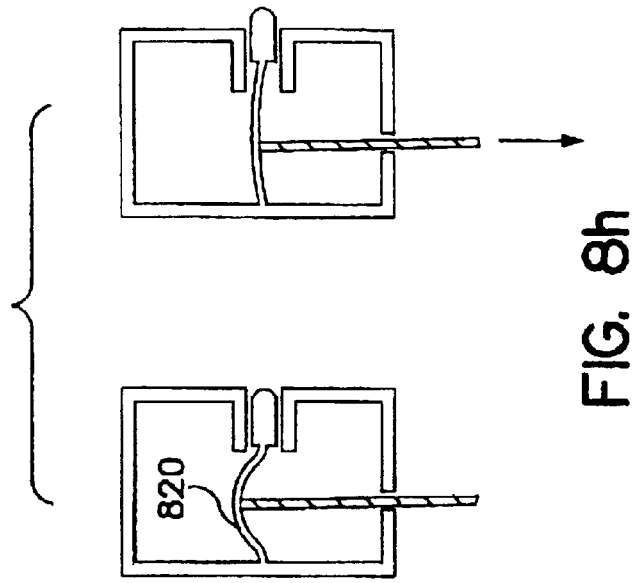
Figure 8G:
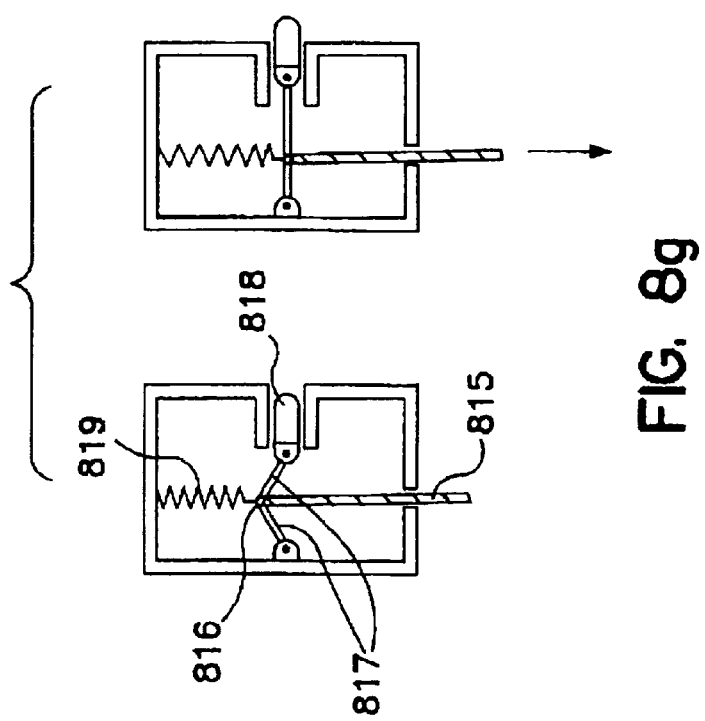

FIG. 8g is a cross-section view of a finger tip texture simulator where a tendon 815 pulls on the middle hinge 816 of the linkage 817, as shown, and raises the texture element 818. When tendon force is released, the spring 819 returns the hinge to its initial position.

FIG. 8h functions similarly to FIG. 8g, but the hinges and spring are replaced by a flexible beam 820. The beam is initially curved, as shown. When a tendon force is applied, the beam straightens, forcing the texture element up.

FIG. 8i is a cross-section view of a finger tip texture simulator where the texture element is raised by generating a pressure by heating either vapor, liquid or a combination of the two 821. Current is passed through the resistive heating coil 822, causing the vapor (or liquid) to heat up and expand and raise the texture element.

FIG. 8j is a cross-section view of a finger tip texture simulator where the texture element is raised by piezoelectric elements. A voltage applied to a piezoelectric element causes it to either expand or contract depending on the voltage polarity. In the figure, there are two separate pieces of piezoelectric material connected to form a "bimorph". The two element are wired with opposite polarities such that when a single voltage is applied, one piezoelectric element 823 expands while the other element 824 contracts. When one expands and the other contracts, the bimorph bends towards the direction of the element which contracts. A texture element 825 is attached to the free end of the bimorph and protrudes from the enclosure when the bimorph bends.

Figure 8K:
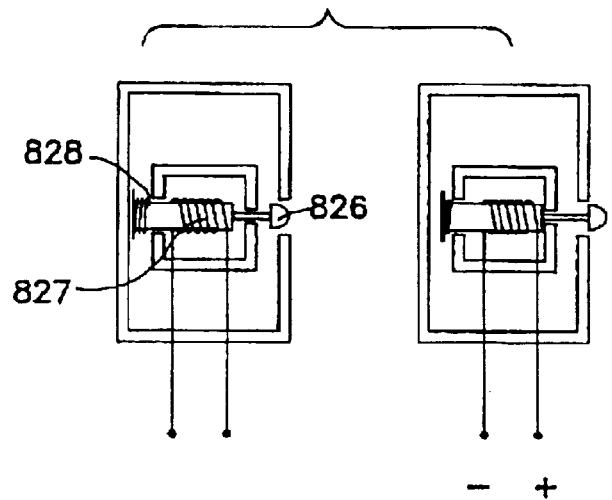

FIG. 8k is a cross-section view of a finger tip texture simulator where a texture element 826 acts as the plunger of a electromechanical solenoid. As current is applied to the coil 827, the texture element is raised. A spring 828 returns the texture element to its initial position when the current is removed.

Figure 8L:
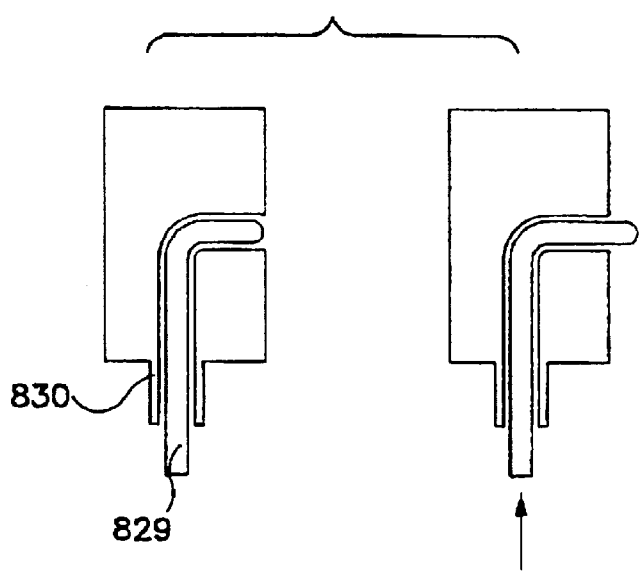

FIG. 8l is a cross-section view of a finger tip texture simulator where a flexible, relatively incompressible fiber 829 (similar to a fiber optic wire) is used. The fiber resides in a flexible, but incompressible outer casing 830 (similar to the tendon/casing assembly). The fiber transfers displacement generated at one location (possibly by a bulky or heavy displacement actuator) to a second location (e.g., the finger tip) by sliding relative to the outer casing. The principle of operation is similar to a catheter tube. The end of the fiber is the actual texture element which protrudes and presses against the finger tip. The difference between this "fiber" method and the tendon method is that the tendon is "active" in tension while the fiber is "active" in compression.

Figure 8M:
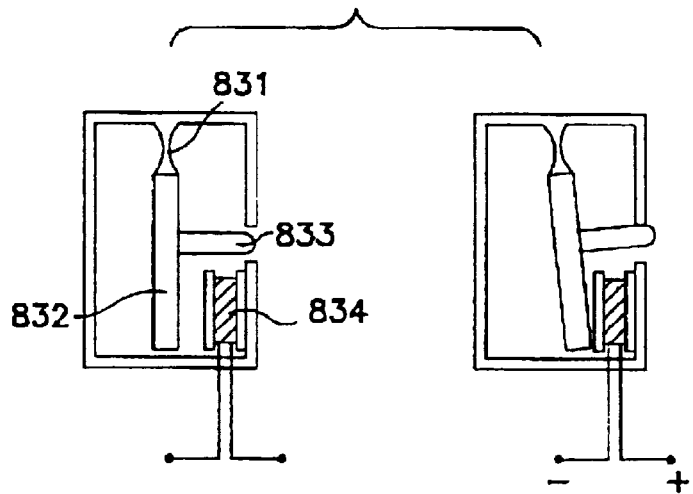

FIG. 8m is a cross-section view of a finger tip texture simulator where a magnetic attraction, in this embodiment generated by electromagnet 834, pulls on the metal bar 832 causing it to pivot. The pivot may either be a hinge with a return spring or a living hinge 831 (as shown). A texture element 833 is attached to the bar which protrudes from the enclosure and presses against the finger tip when the bar pivots. This texture simulator embodiment can be realized with micromotor/microactuator technology.

In the embodiments shown in FIGS. 8i, j, k and m, the actuation displacement for the texture simulator is generated in the finger tip force applicator enclosure itself. Any of these same actuator technologies may be employed, but positioned at an alternate location (e.g., on the wristband or at the same place as the force actuator). The displacement may then be transferred to the finger tip by a tendon or pneumatic/hydraulic tube and used by any appropriate texture simulator.

In addition to the actuator technologies shown in FIGS. 8i, j, k and m, other, more standard force and displacement actuators such as electromechanical motors and pneumatic (hydraulic) compressors (pumps) may be used. Shape memory alloys (SMA, e.g., Nickel/Titanium alloys) may also be used to generate the tensile force or displacement of a tendon. SMA wire has the property that it contracts when heated. The wire may be heated simply by passing an electrical current through it.

Figure 9:
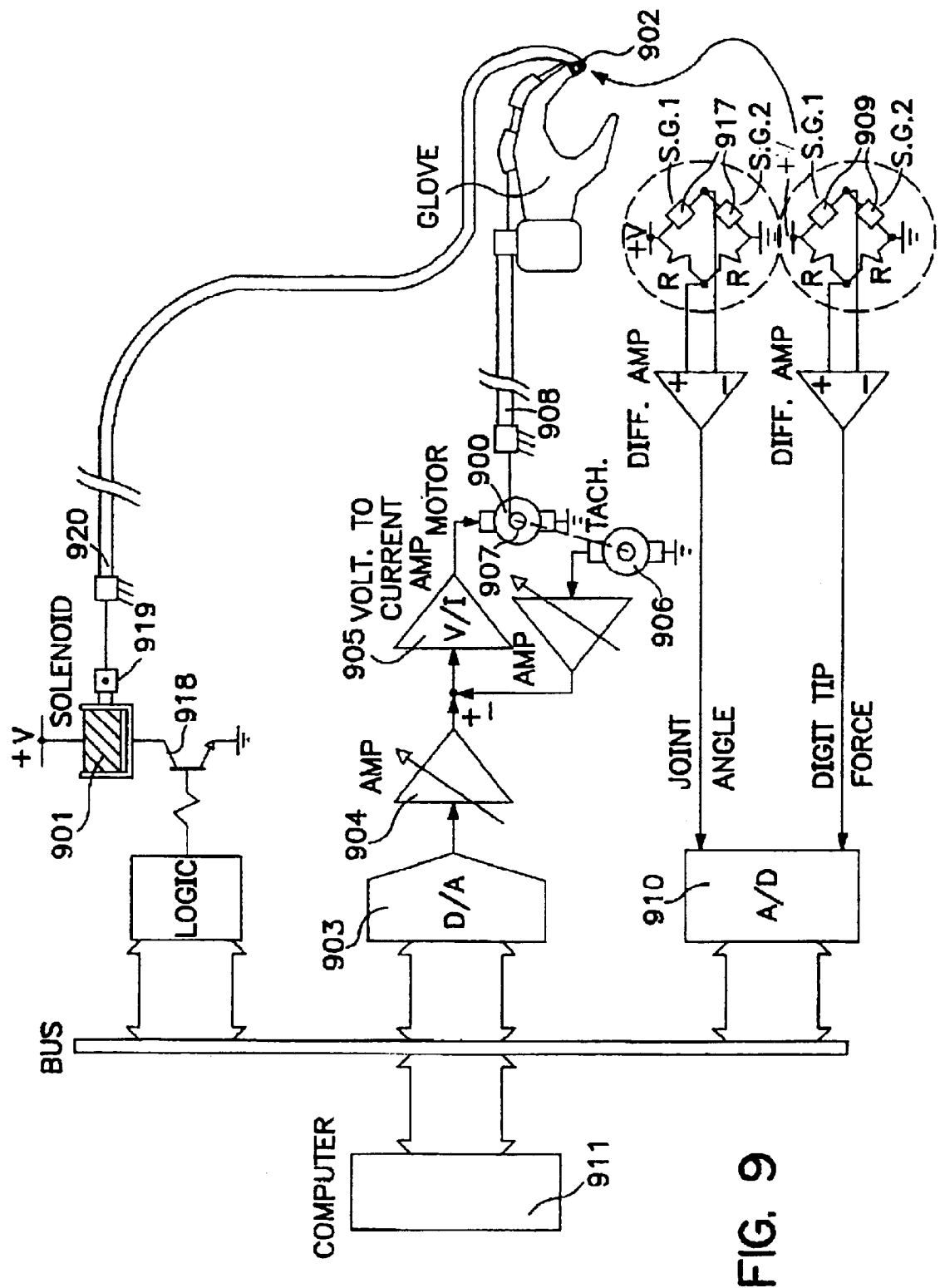
FIG. 9 is a schematic electrical/mechanical signal propagation diagram.
Figure 10:
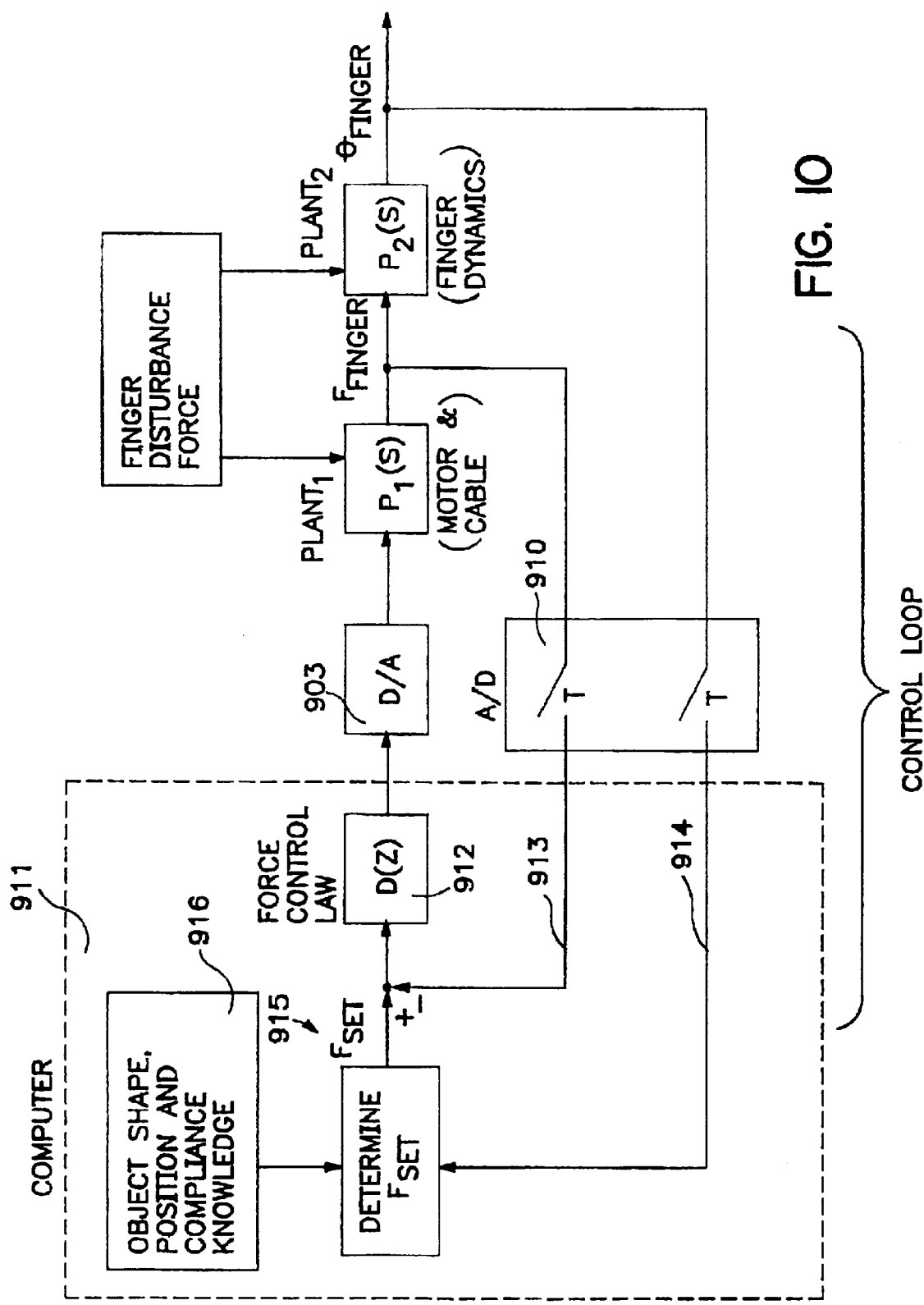
FIG. 10 is a control system block diagram for control of the finger tip force.

FIG. 9 shows how the electrical and mechanical signals propagate through the force/texture feedback control system. FIG. 10 is a diagram of the force and texture feedback control system in standard control theory block diagram form. The embodiment shown employs a d.c. servo motor 900 for force actuation and an electromechanical solenoid 901 to produce the displacement for a texture simulating element 902. A computer sends a digital value representing the desired force to a d.c. servomotor control circuit. In the embodiment shown in FIG. 9, the desired force is presented to the digital-to-analog converter (DAC) 903. The analog output of the DAC is then amplified by a variable gain amplifier 904. This amplified force set point voltage is then converted into a current by a common voltage-to-current configuration of a power operational amplifier 905. This current drives the servo motor at a desired torque. Velocity damping of the servo control loop is performed by tachometer feedback 906.

Torque generated by the motor is converted into a tensile force by a pulley 907 on the motor shaft. The diameter of this pulley is selected to achieve the desired force and speed of response for a given motor. In a preferred embodiment, a pulley diameter of ¼ inch was used. The generated tensile force is transmitted to the finger tip force applicator from the force actuator via a tendon cable/casing assembly 908. The force applied to the finger tip is sensed by the two strain gages 909 mounted differentially to the strain sensing platform and wired into a half-bridge configuration. A full Wheatstone bridge is used to amplify the detected force. This amplified signal is digitized by an analog-to-digital converter 910 and read into the computer 911.

The computer implements a force control law 912 (e.g., Proportional-Integral-Derivative or state feedback) using well understood techniques from the field of digital control. The control law incorporates the feedback force information 913, and servos the motor to produce a desired force at the finger tip. Digitized values 914 from analog joint angle sensors provide the information the computer needs to determine the force set point 915. In a preferred embodiment, the computer converts finger joint angles into actual finger positions. If one of the fingers is found to be intersecting a virtual object, the computer calculates the force to be applied to that finger using knowledge of the virtual object's shape and compliance 916. In a preferred embodiment, differential strain gage angle sensors 917, as disclosed in the Kramer et al. patent application, are used to determine joint angles.

As shown in FIG. 9, the computer also outputs commands to the displacement actuator of the texture simulating array. In the embodiment shown, the computer outputs digital values which control solenoid drive transistors 918. For example, a logical value of "1" turns the transistor "on," and a logical "0" turns the transistor "off." When the transistor is on, the solenoid coil is energized, and the plunger 919 is retracted. The retraction generates a displacement which is transmitted to the texture simulator 902 via a tendon cable/casing assembly 920. The texture simulator uses the displacement to extend the texture elements beyond the surface of the finger tip force-applicator platform against the finger tip. When the transistor is turned off, the solenoid plunger is extended by the return spring and cable tension is released. When the tension is released, the texture element is retracted back into the texture array platform housing by its own return mechanism.

FIGS. 11a–11d are functionally similar to FIGS. 5a–5e in that they all poses a force-applying means and a force-sensing means. The difference is in the force-sensing means. In FIG. 5, the force-sensing means is shown as a force-sensing platform. In FIG. 11 the force-sensing means is shown to include a load cell. The load cell 1100 may employ any of a wide variety of technologies, such as strain gage, capacitive or resistive sensing technologies, and the like. Besides the more common strain gage load cells, force sensor pads which use capacitive sensing technology are discussed in the literature by Fearing and resistive force-sensing pads are available commercially by Interlink and TekScan. In FIGS. 11, the force-sensing means comprises part of the force-applying means. The force-sensing/applying structure comprises a platform 1101 which is affixed to support 1102. Support 1102 is connected to the finger tip clip 1103 by spring 1104. Force-transmitting tendon 1105 is affixed to platform 1101. Load cell 1100 is affixed to the finger side of platform 1101. For various reasons, such as when the load cell surface is not rugged or if the load cell is temperature sensitive, a protective/temperature insulating platform 1106 is affixed to the finger side of the load cell. When the tension in tendon 1105 is increased (FIG. 11c), platform 1101 presses on the load cell 1100 which in turn presses platform 1106 against the finger tip. The load cell measures the tension in tendon 1105 at the finger tip.

FIGS. 12a and 12b are side and plan views of a force-applying platform which is capable of pivoting to make the contact pressure between the platform and the finger tip as uniform as possible. In this embodiment, platform 1200 pivots on hinge 1201 which is connected by support 1202 to return spring 1203, which in turn is affixed to finger tip clip 1204. When tension is applyed to tendon 1205, platform 1200 contacts the finger tip and rotates on hinge 1201 to make the contact pressure uniform.

FIG. 13 is a side view of an extension of FIG. 12, with the addition that the contact pressure distribution between platform 1300 and the finger tip may be modified by adjusting the tension in tendons 1301 and 1302. If the tension in tendon 1301 is greater than in tendon 1302, then the finger tip will detect greater contact force nearer the fingernail than the bottom of the finger tip.

FIGS. 14a and 14b are the side and plan view of yet another embodiment which is used to modify the pressure distribution sensed by the finger tip. This embodiment, platform 1400 is capable of pivoting in any direction due to the connection to support 1401 via ball joint 1402. By varying the tension in tendons 1403 and 1404, the centroid of pressure may be shifted vertically, whereas varying the tension in tendons 1405 and 1406, the centroid of pressure may be shifted laterally. By uniformly varying the tension in all tendons, the magnitude of the pressure distribution may be changed accordingly without shifting the centroid. Although the embodiment provided only shows four tendons in a symmetric pattern, the concept obviously may be expanded to include more tendons and in more complex patterns.

FIG. 15 is a side view of an embodiment showing how the tension in the tendon may be measured prior to the platform contacting the finger tip. Platform 1500 is affixed to support 1501 which is attached to to finger tip clip 1502 via flexible elastic member 1503. The extent of flexion of 1503 is a measure of the force applied to platform 1500 by tendon 1506 until the platform contacts the finger tip. With this capability, it can be sensed, among other things, when the tendon is slack. In the embodiment shown, the flexion is measured via differential strain gages 1504 and 1505.

FIGS. 16a and 16b are side views of two more methods to measure tendon tension, and thus, force applied to the body part. In the embodiments provided, the tension is being measured near the force-generating actuator. The same measurement principles may be used to sense tendon tension at the force-sensing body part, for example, at a feedback glove. In FIG. 16a, tendon 1600 is wound on pulley 1601 which is in the shaft of force-generating actuator 1602, which in the embodiment provided is a motor. The tendon passes over pulley 1603, under fixed pulley 1604 and enters casing 1605. Pulley 1603 is affixed to the free end of cantilever 1606, while the other end of the cantilever is anchored securely. When tendon tension is increased, pulley 1603 is displaced downward, causing the cantilever also to displace downward. In the embodiment provided, this cantilever displacement is measured via differential strain gages 1607 and 1608. Other displacement sensing technologies may be substituted.

FIG. 16b shows how the tendon tension may be measured by sensing the stress in the tendon casing. Tendon 1609 leaves the force-generating actuator 1610 and enters a tendon casing stress sensing sleeve 1611. This sleeve is affixed to casing support 1612 at one end, and not connected to anything at the other end. At the free end, the sleeve presses against a spacer 1613 which then presses against the main section of the tendon casing 1614 which guides the tendon to its destination. The spacer is not connected to anything, but may rest idle on the tendon. Casing 1614 is guided and supported by structure 1615. The stress experienced by stress sensing sleeve 1611 is sensed, in the embodiment provided, by differential strain gages 1616 and 1617. The use of spacer 1613 and support 1615 reduces the influence that lateral motion of casing 1614 would otherwise have on the sensed stress.

Figure 17A:
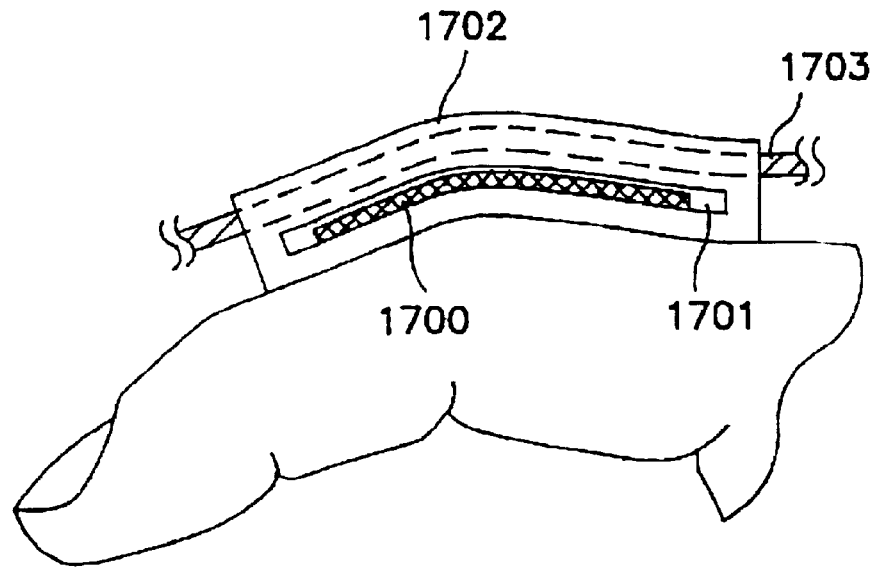
FIGS. 17a and 17b are side views of two embodiments of a structure which supports both a bend sensor and a force-transmitting tendon.
Figure 17B:
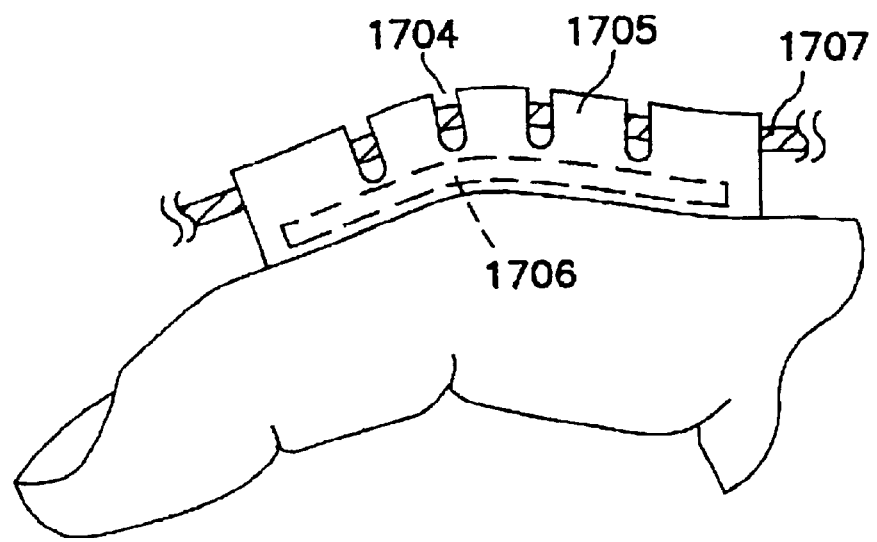

FIGS. 17a and 17b are side views of two embodiments of a structure which supports both a bend sensor (e.g., the strain gage bend sensor of Kramer et al.) and a force-transmitting tendon. FIG. 17a shows a cross sectional view of an embodiment where bend sensor 1700 is in guiding pocket 1701 in support structure 1702. The support structure is affixed in proximity to the joint whose angle is to be measured, shown in FIGS. 17a and 17b to be the PIP joint. Force-transmitting tendon 1703 is also supported over the body part by structure 1702. The tendon may reside in a trough or pass through a hole in structure 1702. Structure 1702 should move in relation to the body part during flexure and may be made of a variety of materials including plastic, RTV silicon rubber and the like.

FIG. 17b is a side view of a tendon/bend sensor support structure similar to FIG. 17a but has portions of material removed 1704 from the structure 1705 to permit easier bending. The dashed line outlines where the bend sensor 1706 may be positioned in the support structure. Although, in both FIGS. 17a and 17b, the bend sensor is shown positioned in the support structure between tendon 1707 and the body part, other topologies may be used, such as the tendon between the bend sensor and the body part.

Figure 18A:
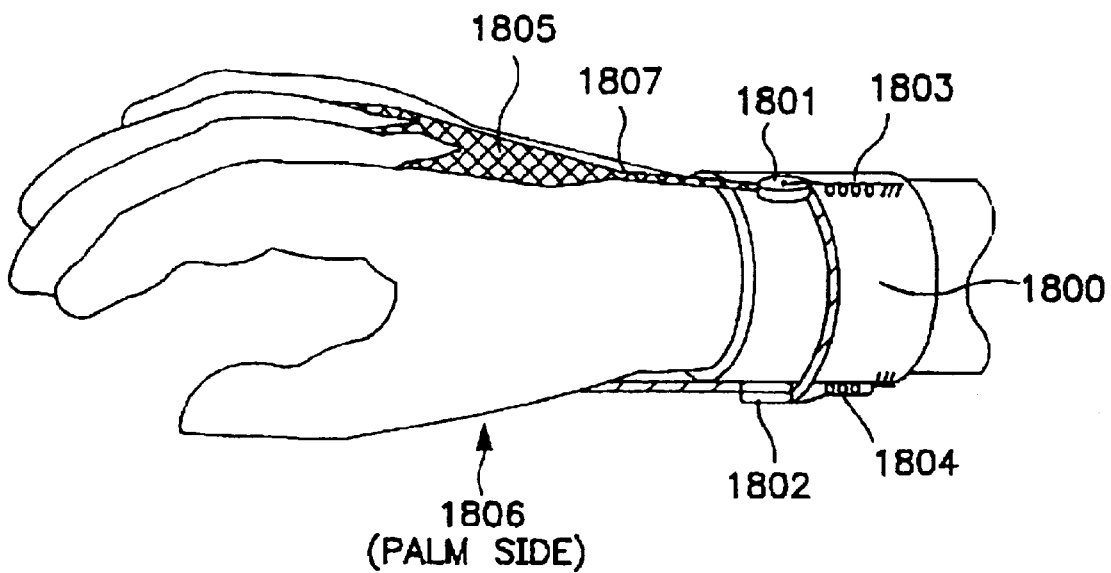
FIGS. 18a and 18b are a perspective and plan view of an embodiment which provides a pre-tension between a force feedback glove and the casing support wristband.
Figure 18B:
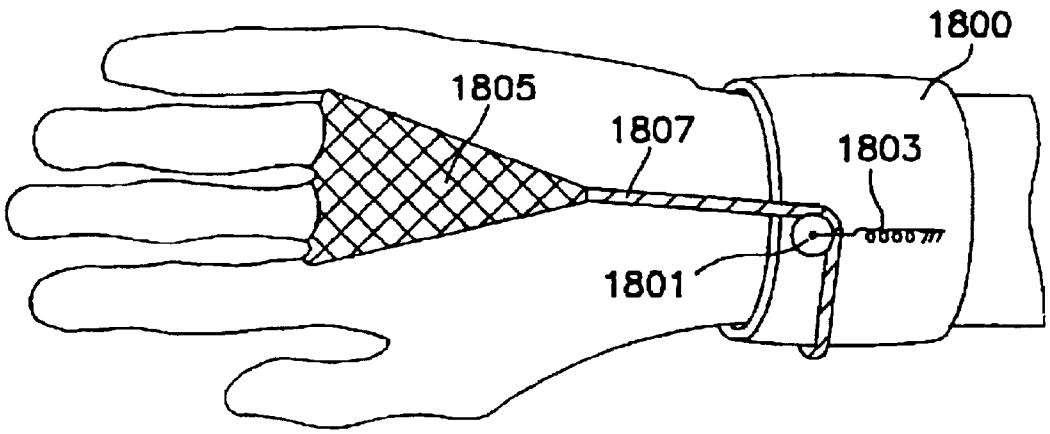

FIGS. 18a and 18b are a perspective and plan view of an embodiment which provides a pre-tension between a force feedback glove and the casing support wristband. The embodiment provided is a schematic representation and a variety of details may be added to support the functional parts. In this embodiment, there are two pulleys mounted on wristband 1800, one on the top 1801, one on the bottom 1802. The pulleys are able to translate in either direction along the axis of the forearm, optionally in a slotted guide, but are pulled in the direction away from the glove by elastic members 1803 and 1804. The pulleys may also be allowed to slide in a direction that is not parallel to, but has a component along the axis of the forearm. The glove is reinforced on both the top 1805 and bottom 1806 (similar to top side reinforcement, but not shown). The reinforced sections are connected to each other via pretension tendon 1807 which passes over pulley 1801, around the wrist (optionally over a bearing surface such as a series of roller bearings), and over pulley 1802. The reinforced glove sections serve to distribute the pre-tension force over the hand. The reinforcement may be extra material such as nylon, plastic or RTV silicon rubber. The wristband is strapped around the wrist at a location that places the elastic members in tension. The tension serves to draw the wristband toward the glove, without allowing the wristband to slide relative to the skin, and thus taking up the slack in the forearm skin so there is little motion of the wristband later when a force-transmitting tendon is placed in tension.

Figure 19:
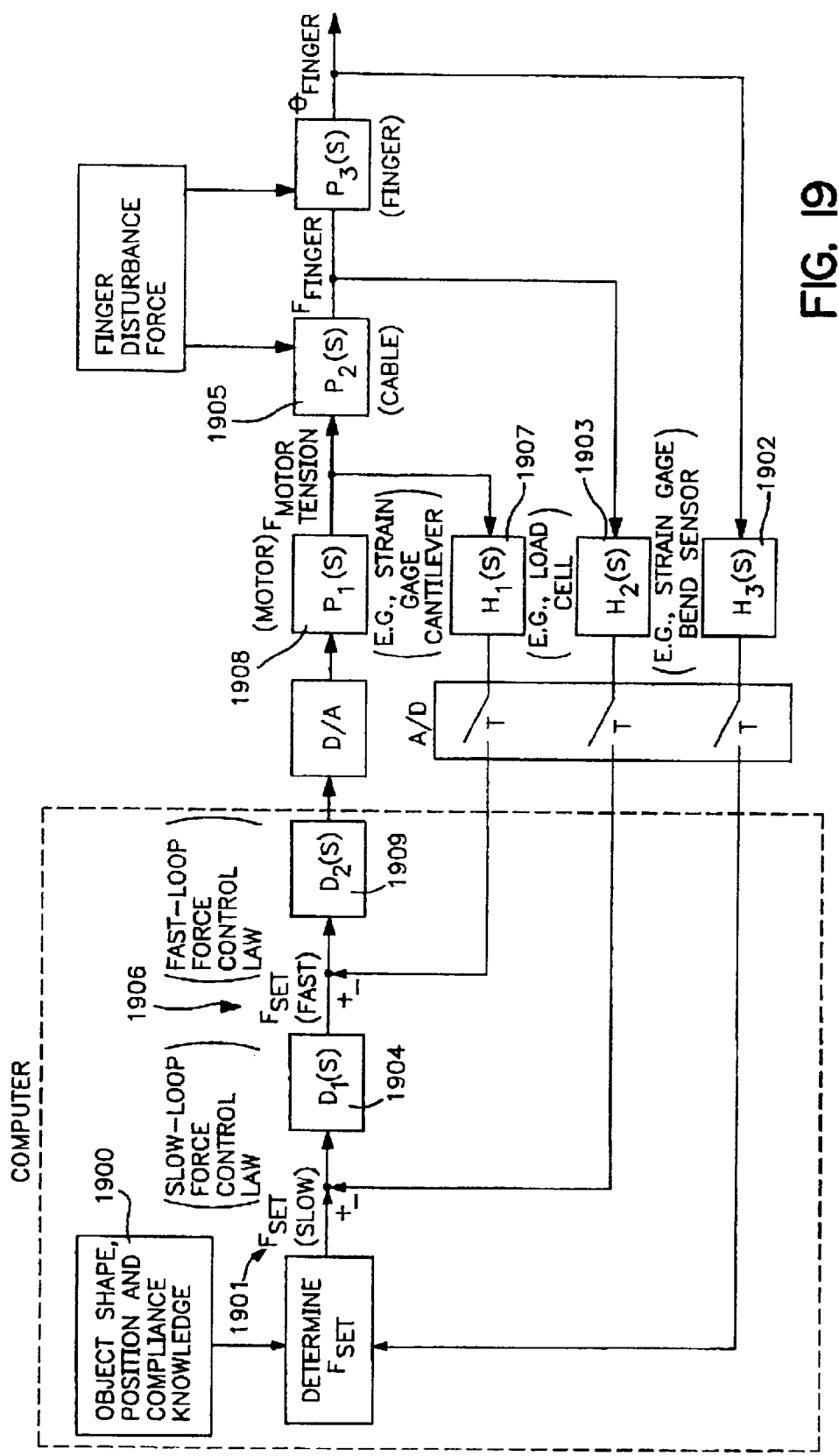
FIG. 19 is the block diagram of a three-loop force control system.

FIG. 19 is the block diagram of a three-loop force control system. The diagram is very similar to FIG. 10 with the addition of an inner servo loop that controls the force sensed at the output of the force actuator. This inner servo loop is a "fast loop" which may have a high gain to quickly adjust the force output by the force actuator based on sensing the output force near the force actuator itself. A computing device 1900 which has knowledge of, for example, the environment, object shape, position and compliance, determines a force set point 1901 for the control system based on additional knowledge of finger tip position which may be sensed by the Kramer et al. strain gage bend sensors 1902 or suitable substitute. This force set point is compared to actual force sensed at the finger tip by a suitable sensor 1903, such as the force-sensing platform or appropriate load cell. The error in the force signal is input to the "slow loop" controller 1904 which may be running a standard control law. This is called the slow loop because the gain shouldn't be too high since there are some nonlinear dynamics involved, if the cable force-transmission system 1905 is employed.

The output of the slow loop controller is the force set point 1906 to the "fast loop" control system. This fast loop set point is compared to a force sensed (e.g., by the previously described strain gage cantilever 1907 of FIG. 16) at the output of the force actuator 1908 which produces the error signal input for the fast loop controller 1909 which also may be running a standard control law. The gain of the fast loop may be large compared to the gain of the slow loop controller since the dynamics of this loop are fairly linear and are relatively fast if a good quality servo motor were used. Therefore, the tension output of the motor can be controlled to a desired value very quickly, whereas the force sensed at the finger tip cannot be servoed to a desired value as quickly without increasing the possibility of oscillation due to the nonlinear transmission system.

By appropriately combining commands to the texture array and the force applicator, numerous sensations may be applied to the finger tip. For example, by extending three texture elements along a single column and then actuating the force platform to press against the finger tip, the sensation of touching the finger tip to the vertical edge of a virtual object is simulated. If the three extended texture elements of the column are retracted at the same time that the three elements of the adjacent column are raised, a sensation that the object edge is moving across the finger tip will be produced. This sensation may be used either when an object edge is moving and the finger tip is remaining stationary, or when the object position is fixed and the finger tip is moving across the edge. With appropriate modifications, force and texture may be simulated at other parts of the body besides the finger tip, such as is shown for the arm in FIG. 2*c*.

Figure 20A:
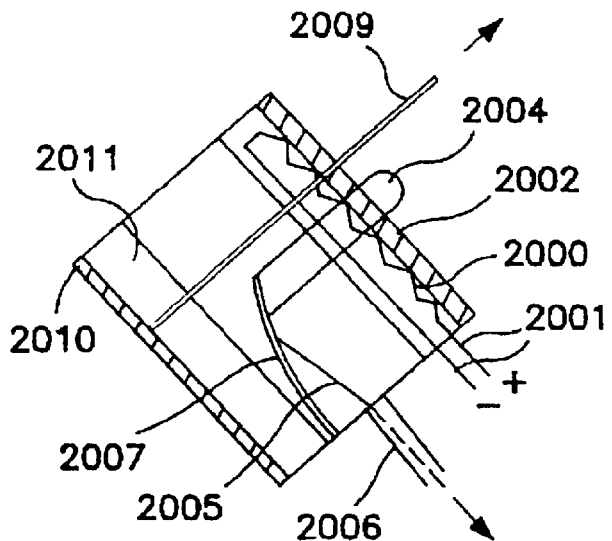
FIGS. 20a and 20c are side cross-sections of a feedback element capable of providing force, texture, pressure and temperature sensations to a user, as well as sense applied force, pressure and temperature.

FIG. 20*a* is the side crosssection of a feedback assembly which is capable of simulating force, texture, pressure and temperature, as well as providing a measurement of force, pressure and temperature. For clarity, the figure only shows a heating element 2000, however, a cooling element may also be used or used instead of the heating element. The heating element 2000, with leads 2001 is positioned in or on the feedback assembly. When energized, element 2000 converts electrical energy into heat which is then transfered to the skin of a user, either via convection or via conduction through thermally conductive surface 2002. The surface is preferrably made of metal, but may be made of other materials cabable of transmitting the heat from the heating element to the body part, and capable of applying a force transmitted via force element 2009.

When displacement transmitting element 2005, inside housing 2006, is placed in tension, flexible spring element 2007 deflects and tactile element 2004 protrudes through an opening in surface 2002 and may press against a body part.

When force transmitting element 2009 (which is affixed to surface 2010) is placed in tension, the entire feedback assembly may be forced against a body part. Surface 2002 is the surface which comes into contact with the body part. Force/pressure sensing element 2011 senses the force with which the feedback assembly is pressed against the body part. There are many force/pressure sensor technologies which may be used for 2011. Such technologies include silicon-based and other types of load cells, strain gages, back-pressure, piezoelectric and the like.

Figure 20B:
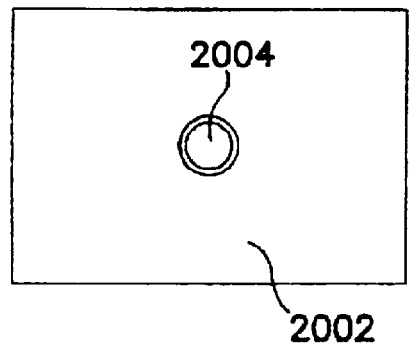
FIGS. 20b and 20d are plan views of the feedback elements.

FIG. 20*b* is the plan view of the feedback assembly. Although the view shows a rectangular assembly, the assembly may be any suitable shape, such as round.

Figure 20C:
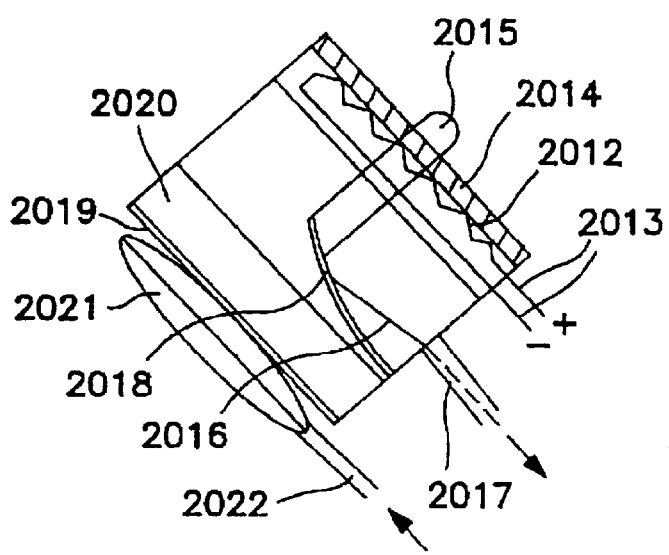
Figure 20D:
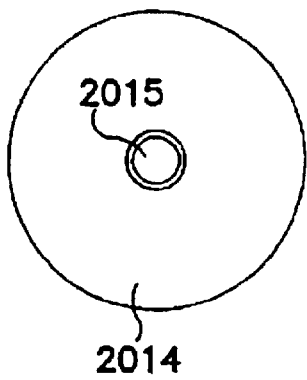

FIG. 20*c* is the side cross-section of another feedback assembly capable of simulating force, texture, pressure and temperature, as well as providing a measurement of force, pressure and temperature. Again, for clarity, only a heating element is shown. FIG. 20*c* has many of the same features as FIG. 20*a*, except, force-transmitting element 2009 has been replaced with a pressure simulating element 2021. Suitable pressure simulating elements include diaphrams and bellows and may be pneumatic or hydraulic and the like. The pressure simulating element may also include a voice-oil device as the active element (see FIGS. 28*a*–28*f*).

Figure 21A:
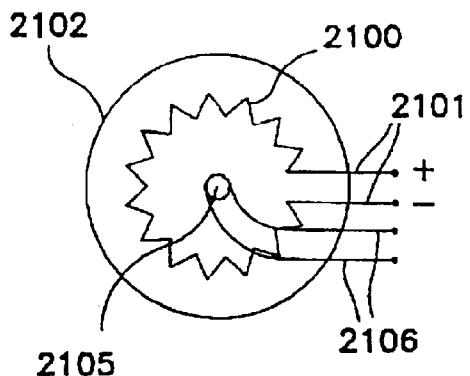
FIGS. 21a and 21b are plan views of a round and rectangular heating assembly.
Figure 21B:
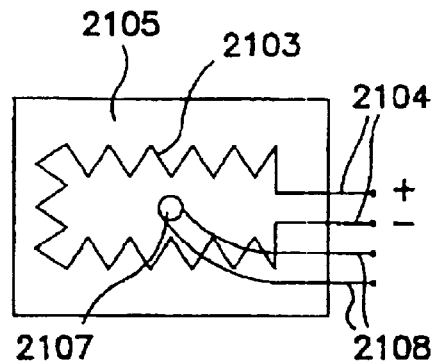

FIGS. 21*a* and 21*b* show a plan view of a heat actuating and temperature sensing device. FIG. 21*a* shows a round device enclosure 2102 while FIG. 21*b* shows a rectangular enclosure 2105, however, any suitable shape may be used. There are a variety of heating technologies that may be used to simulate contact with a warm surface or substance. FIGS. 21*a* and 21*b* provide one such means. In FIG. 21*a*, element 2100 with electrical leads 2101 converts electrical current into heat. Many materials may be used for the heating element, such as a Tungsten filament. Shown in the center of the heating element is temperature sensor 2105 with electrical leads 2106. Many different temperature sensors may be used, such as thermocouples, RTDs and thermistors. The temperature sensor may be used to measure the temperature of a body part and/or used to measure the temperature produced by the heating element for temperature feedback FIG. 21*b* is mostly the same as FIG. 21*a* except the shape is rectangular instead of round.

Figure 22A:
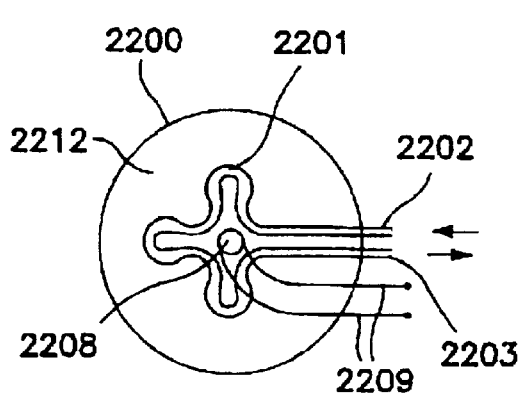
FIGS. 22a and 22b are plan views of a round and rectangular cooling assembly.
Figure 22B:
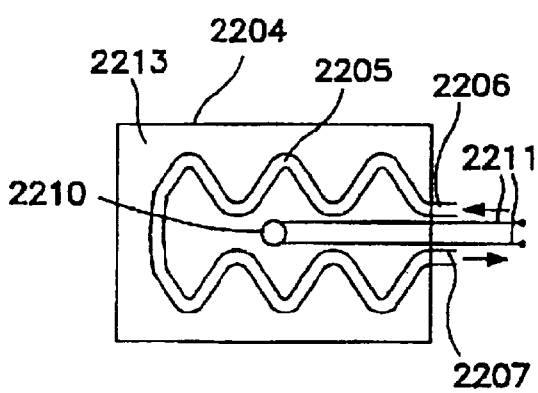

FIGS. 22*a* and 22*b* show a plan view of a cooling device and temperature sensing device. FIG. 22*a* shows a round device enclosure 2200 while FIG. 22*b* shows a rectangular enclosure 2204, however, any suitable shape may be used. There are a variety of cooling technologies that may be used to simulate contact with a cool surface or substance. FIGS. 22*a* and 22*b* provide one such means. In FIG. 22*a*, 2201 is a cooling-fluid guiding element. The guiding element guides the cooling fluid through a thermally conductive material 2212 such that heat is transfered (from the body part in proximity to the surface of the cooling device) to the cooling fluid. The cooling device is in effect a heat exchanger. Cool fluid entering the guide at 2202 is cooler than the fluid exiting the guide at 2203. Temperature sensor 2208 with leads 2209 is shown in proximity to the cooling-fluid guiding element and may be used to measure the temperature of the body part and/or used to measure the temperature of the cooling device for a temperature control system. Note that the device of FIGS. 22a and 22b may be used to simulated contact with surfaces and substances of a variety of temperatures (e.g., warm as well as cool) depending on the temperature of the fluid passed through the fluid guiding element.

Figure 23:
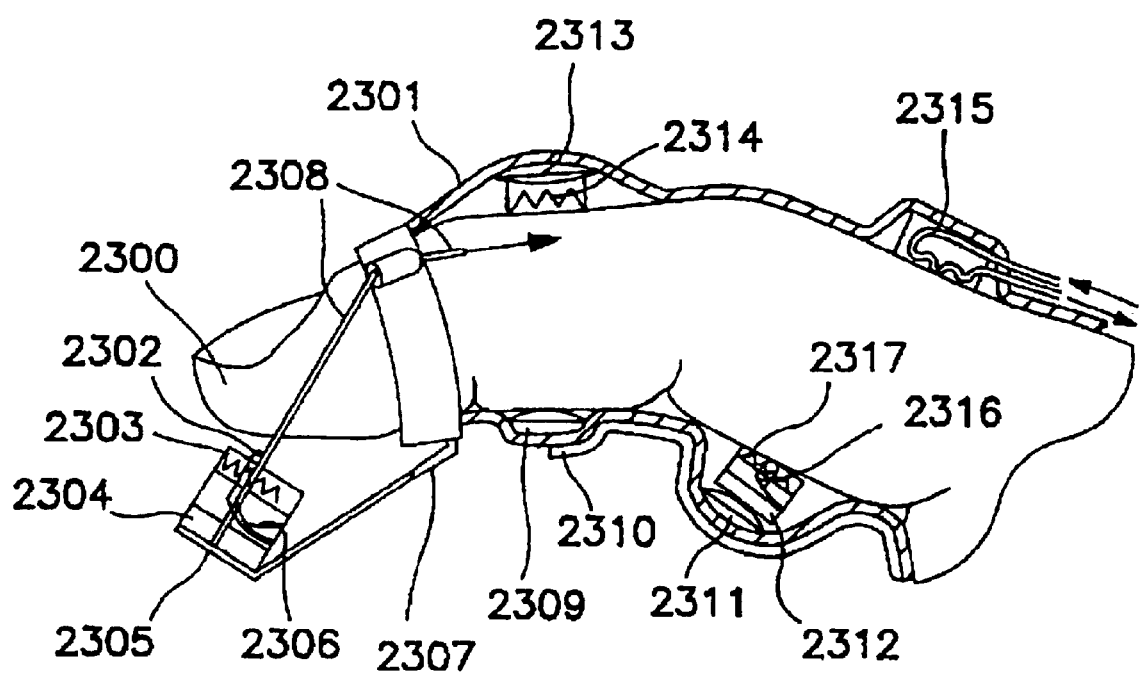
FIG. 23 is a side cross-section of a finger (hand) in an example master feedback glove, where the glove includes a force, texture, pressure and temperature simulating/measuring assembly for the fingertip, and various other simulation assemblies arranged about the finger and hand.

FIG. 23 is a side view cross-section of a hand and finger inside a force feedback glove. Although the force feedback glove may include a variety of sensors to measure position of the fingers and hand (e.g., strain gage flex sensors of U.S. Pat. No. 5,047,952 by Kramer et al, and electromagnetic position sensors of U.S. Patent Application Serial No. x, by Kramer), such position sensors have been omitted from FIG. 23 for clarity. In FIG. 23, feedback glove 2301 is shown placed about various portions of the fingers and hand. In particular to the figure, the finger tip 2300 is not covered by the glove material.

A feedback assembly is provided which includes but is not limited to one or more of the following: a force-applying platform 2002, a force-sensing platform, one or more texture elements 2004, 2300, a heating/cooling element 2100, 2201, 2303, a pressure-producing element 2021, 2800, 2806, a temperature sensor 2105, 2208, a pressure sensor 2011 and a force sensor 2011. The texture elements 2302 are capable of extending and retracting. In FIG. 23 the state of extension depends on the tension in the displacement transmitting element 2306. Texture element 2302 may also take the form of a focused fluid stream. When activated, force-transmitting element 2308 brings the feedback assembly from an unactivated position (e.g., not contacting a body part) to an activated position (e.g., contacting a body part). In the figure, 2307 acts as a return spring when tension is reduced from 2308.

2313 is a pressure-producing element combined with temperature-producing element 2314. 2315 is a cooling element in proximity to a body part. 2309 is a pressure-producing element employed alone, where 2310 is a fluid guide for when the pressure-producing element is a diaphram or bellows. 2311 is a pressure-producing element combined with force/pressure sensor 2312, one or more texture elements 2316 and temperature-producing element 2317. This figure is intended to provide examples of how force, texture, pressure and temperature that may be combined in feedback assemblies and the feedback assemblies placed about a feedback glove. The same feedback assemblies may be placed about other sensing body parts. Variations in the combinations and their placements about the glove may be made without departing from the intended scope of the subject invention.

Figure 24A:
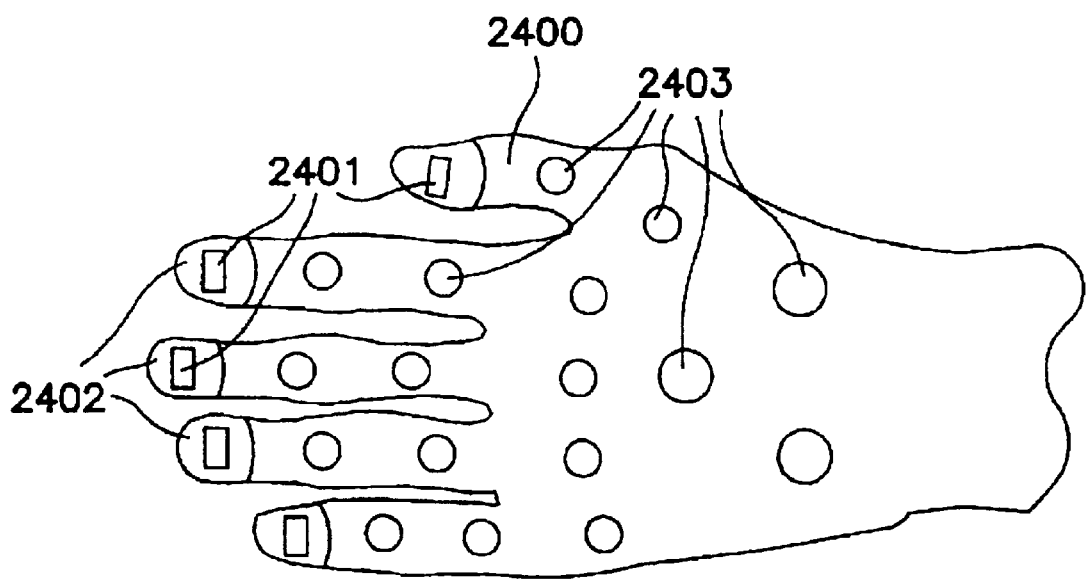
FIGS. 24a and 24b are the top bottom and top views of a hand with an example master glove, where there are force, texture, pressure and temperature simulating/measuring assemblies arranged about the fingers and hand.
Figure 24B:
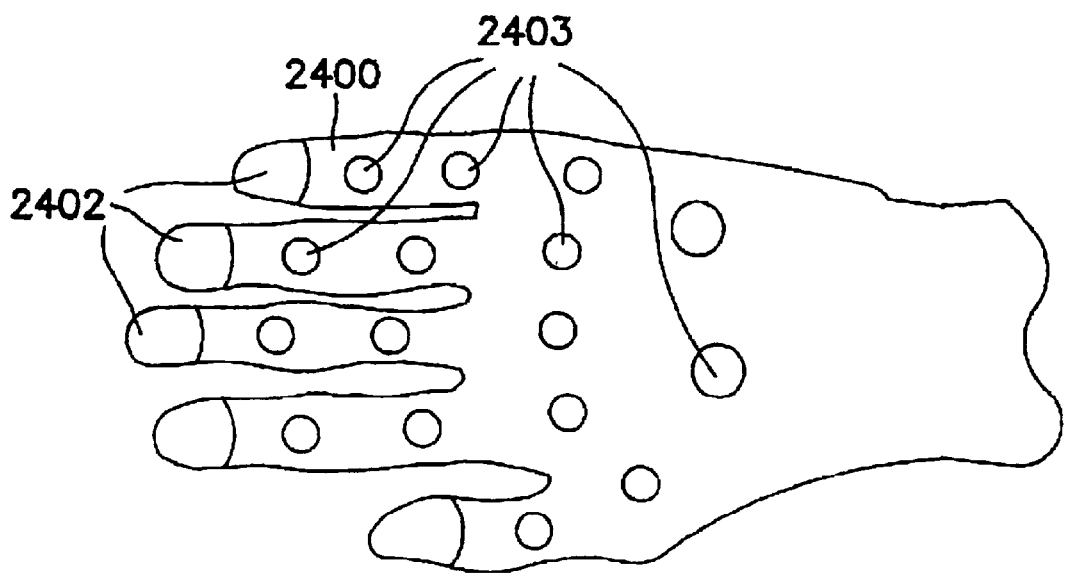

FIGS. 24a and 24b are the bottom and top view of a feedback glove 2400 with feedback assemblies 2401, 2403 positioned about the fingers 2402 and hand, where the feedback assemblies comprise one or more of: a force-applying platform 2002, a force-sensing platform 502, one or more texture elements 2004, 2300, a heating/cooling element 2100, 2201, 2303, a pressure-producing element 2021, 2800, 2806, a temperature sensor 2105, 2208, a pressure sensor 2011 and a force sensor 2011.

Figure 25A:
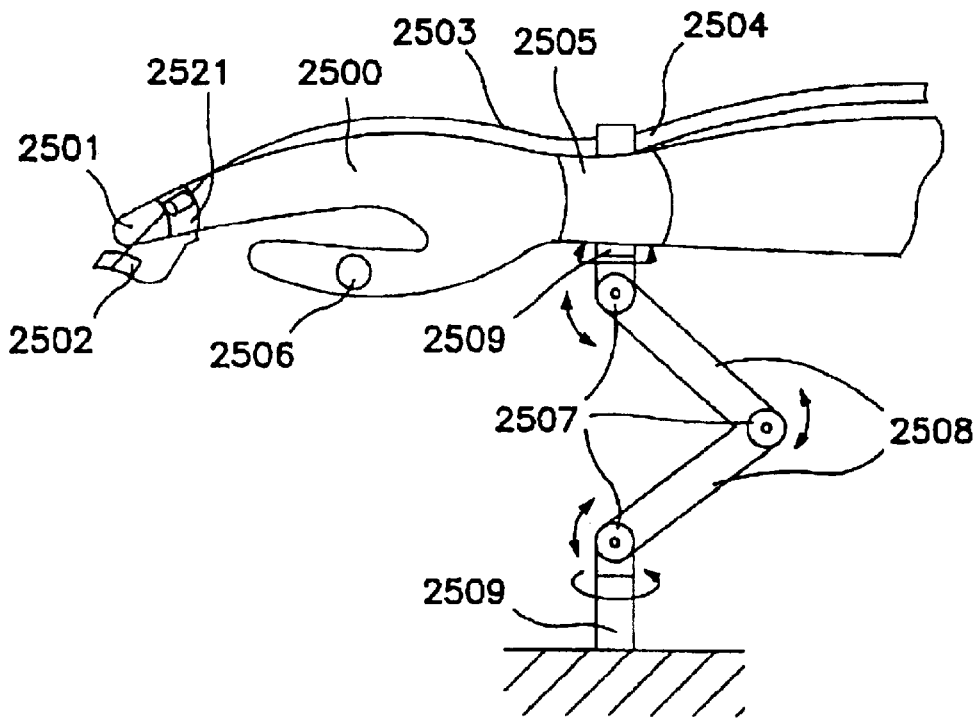
FIGS. 25a and 25b show a method of applying a force to the arm.
Figure 25B:
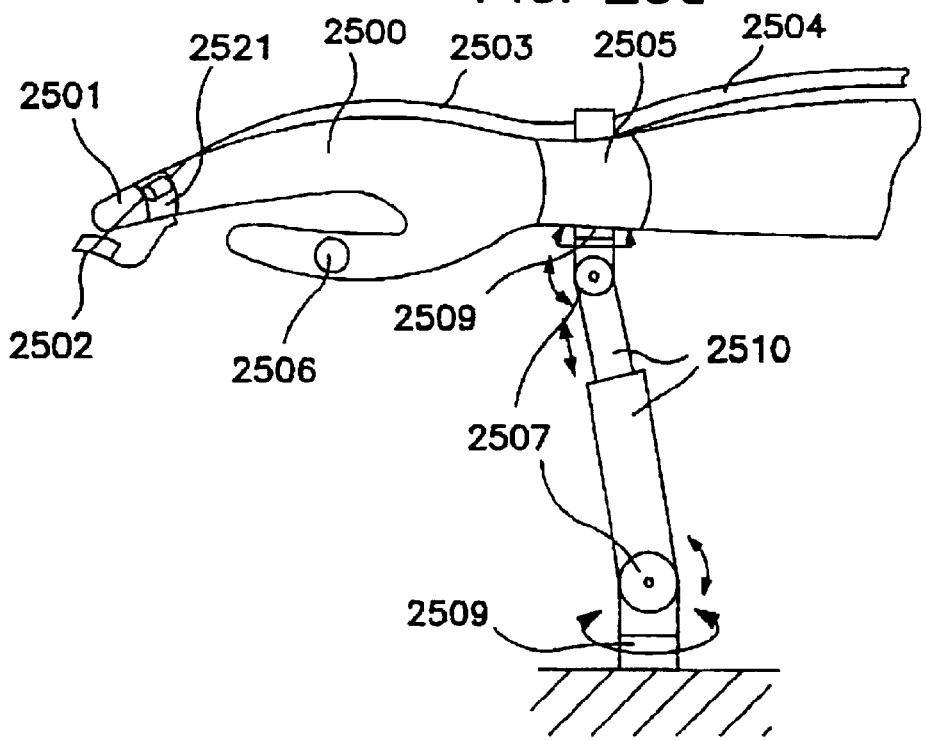

As shown in the embodiment of FIG. 25, force-transmitting element 2503 is capable of aligning a force between a sensing body part (i.e., the finger tip 2501) and a non-sensing body part (i.e., the wrist). This configuration allows grip force and other surface and light contact information to be simulated to the finger tip and hand, but does not provide for the force information which should be provided to the user's arm and torso about the contact and inertial forces involved when pushing on a virtual (simulated) wall. Without feedback of such forces, the user may not crush a telemanipulated cup, but he/she may not be able to determine the weight of the cup. The mechanisms affixed to the wristband 2505, 2604 and 2517 in FIGS. 25 and 26 provide inertial and full-arm feedback FIGS. 25a and 25b provide means for applying force to arm and other sensing an non-sensing body parts. In the embodiment of FIG. 25, the force is applied to the arm through a wristband 2505. In this embodiment, the wrist is a non-sensing body part. This embodiment also includes a feedback glove 2500. The feedback glove leaves the finger tip 2501 uncovered, and has a feedback assembly 2502 suspended from finger tip dip 2521. When tendon 2503 is activated, assembly 2502 moves from a non-contacting position to a position in contact with the finger tip. Feedback assemblies 2506 are also placed about the feedback glove in other locations.

FIG. 25a provides an articulated force-generating apparatus which includes only revolute joints 2507, 2509 interconnected by linkages 2508. Associated with each joint (but not shown in the figure for clarity) is a force-generating element. Many different types of force-generating elements may be used, such as electrical motors, pneumatic motors, hydraulic motors and the like. Also associated with the force-generating apparatus (but not shown in the figure for clarity) is a force-sensing means which measures the force being applied to the body part (e.g., wrist/arm). The force-sensing means may be a multi-axis force sensor located in one of the links, most commonly in the link which joins the apparatus to the arm. The force-sensing means may also be torque sensors located in each joint. The back-emf of an electrical motor may be used as the torque sensor in the corresponding joint. By controlling the angles of the joints, the arm may be controlled to a selected position or controlled to perceive a selected force.

FIG. 25b is similar to FIG. 25a except FIG. 25b includes one or more prismatic joints 2510 in addition to revolute joints. Associated with the prismatic joint (but not shown in the figure for clarity) is a force generator and force sensor. By controlling the angles and extensions of the joints, the arm may be controlled to a selected position or controlled to perceive a selected force.

Figure 25C:
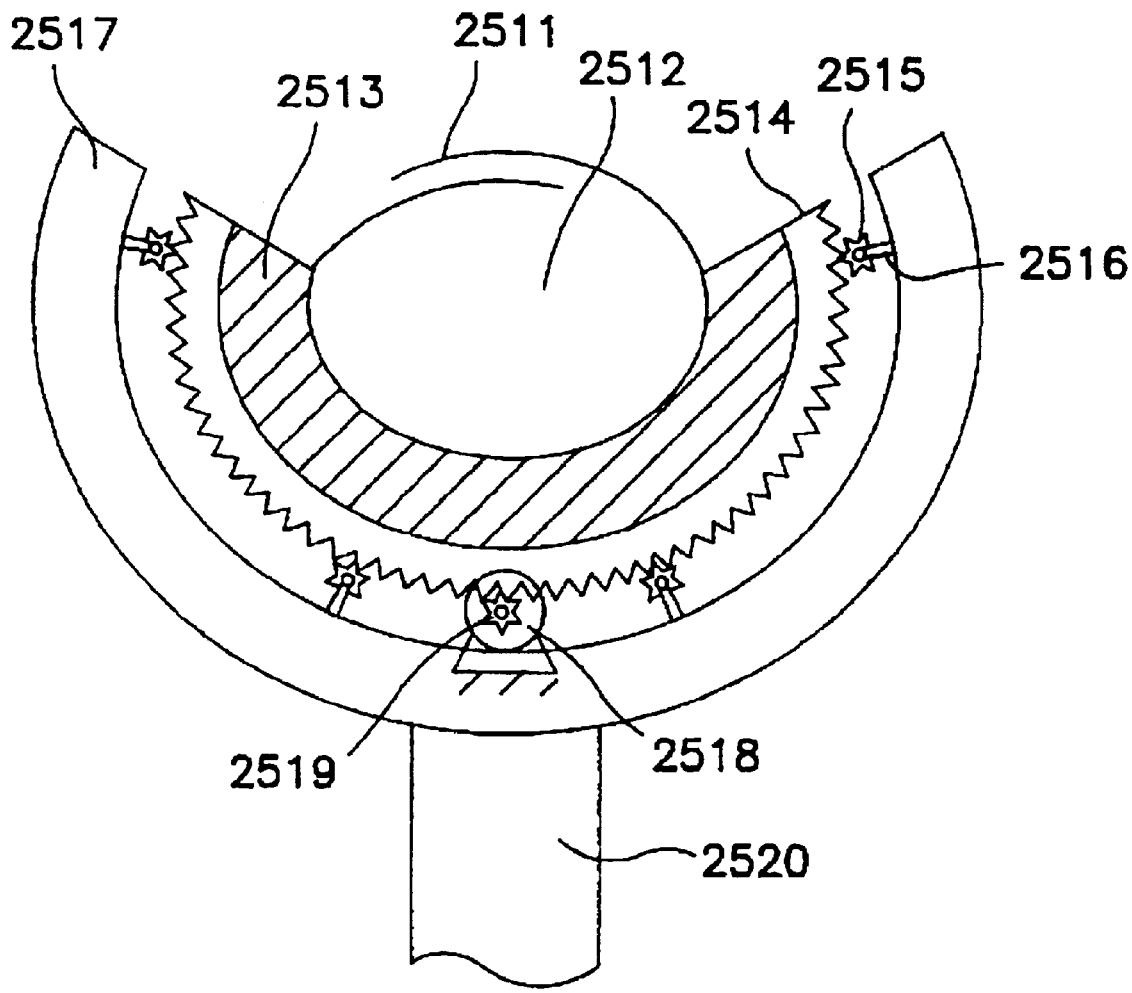
FIG. 25c is and end-view of an embodiment which can apply rotary force to a body part, e.g., the wrist.

FIG. 25c is an end-view of a mechanism which can apply a rotary force to a body part, e.g., a wrist. The mechanism of FIG. 25c is exemplary of a family of mechanisms which may be used to provide the desired result. The body part resides in area 2512 and may be secured via strap 2511. The enclosure 2513 about the body part is affixed to element 2514. Element 2514 is shown schematically to possess gear teeth, however, the teeth are not necessary. Element 2514 is suspended relative to element 2517. In FIG. 25c the suspension is shown by small idler gears 2515. The rotary placement of element 2514 relative to element 2517 is determined by driven gear 2519. 2519 is driven by a positioning motor 2518. Such a motor may be an electrical motor and the like. Element 2517 is connected to a force-generating apparatus via element 2520.

Figure 26A:
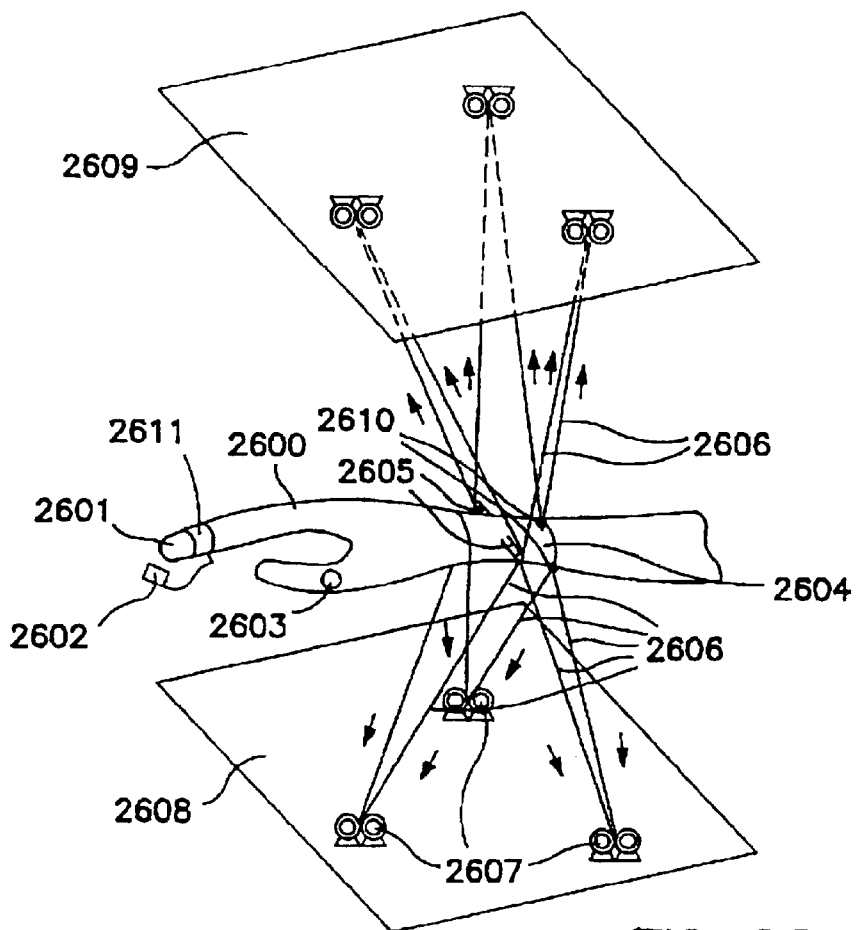
FIG. 26a provides an embodiment where force in any direction may be applied to the arm using only members in tension.
Figure 26B:
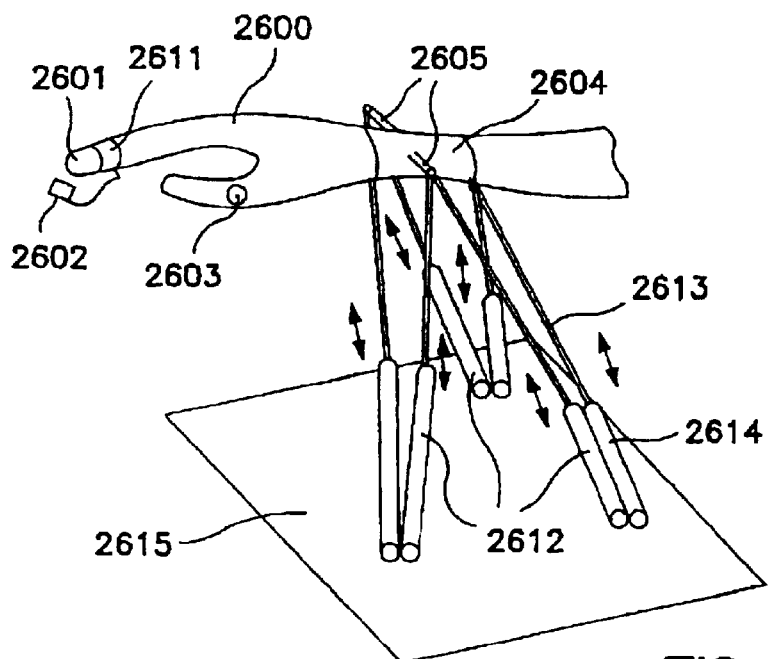
FIG. 26b provides an embodiment where force in any direction may be applied to the arm using members capable of applying both tension and compression.

FIG. 26a and 26b show two more means whereby force may be imparted to a body part. FIG. 26a uses force-transmitting elements which act only in tension, whereas FIG. 26b uses force-transmitting elements which act in tension and compression. In FIG. 26a extending elements 2605 (e.g., posts) extend from the wristband 2604. In a preferred embodiment four tension-transmitting elements 2606 attach to each extending element, as well as four attached to each of two attachment points 2610. It is preferred that one attachment point 2610 is on the top of the wrist and a second on the bottom of the wrist. Associated which each tension transmitting element is a tension-generating element 2607. Associated with the force-imparting apparatus of FIGS. 26a is a force-sensing means. The force-sensing means may be force sensors located in the wristband or in each each tension-generating element. The tension-generating elements are preferably positioned in pairs, the pairs being grouped in tow sets of three, where each set of three is arranged in a triangular pattern. One set of three rigidly positioned above the hand and the other set of three positioned below the hand, as shown in FIG. 26a. In this configuration, a force and/or torque in any direction may be applied to the arm.

FIG. 26b is similar to FIG. 26a except that tension-transmitting elements 2606 are replaced by tension/compression-transmitting elements 2613 and 2614. Since the elements can produce compressive forces in addition to tension forces, only a total of six elements are needed, preferable arranged as shown in FIG. 26b, to produce a force and/or torque in any direction.

Figure 27A:
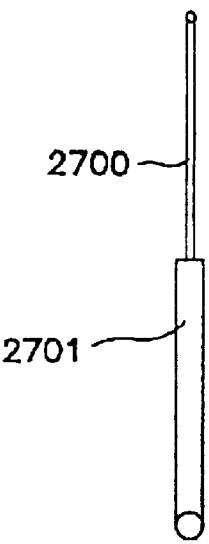
FIG. 27a shows one element which may be used to apply both tension and compression to the arm.
Figure 27B:
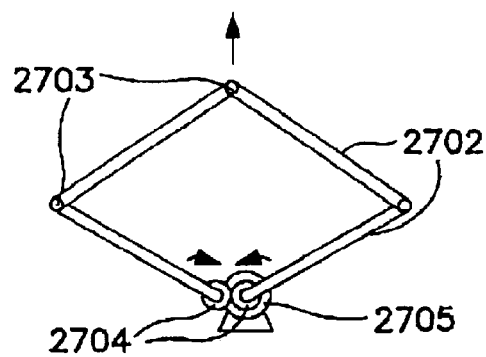
FIG. 27b and 27c provide an alternative mechanism for applying tension and compression to the arm.
Figure 27C:
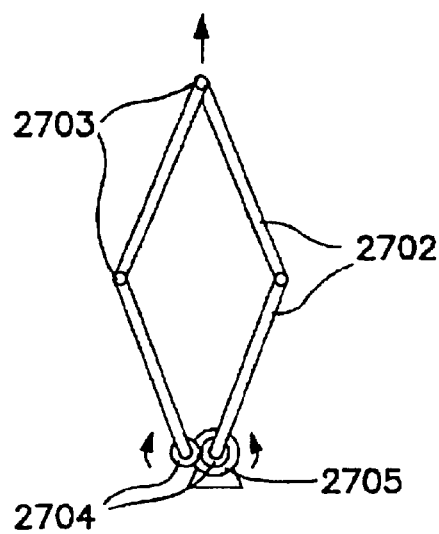

FIG. 27a is a tension/compression-transmitting element Such an element may be a pneumatic or hydraulic cylinder, a linear motor, a lead-screw assembly and the like. The element includes a tension/compression-generating element (not shown). The element of FIG. 27a may be replaced by the element structure of FIG. 27b and 27c, which is known to provide a greater working volume and also more easily allow "back-driving." Links 2702 are connected by joints 2703. Motor 2705 drives one of the two meshing, counter-rotating wheels 2704, which are attached to the associated links. Driving the motor in one direction extends the linkage structure, while driving the motor the other direction retracts the linkage.

Figure 28A:
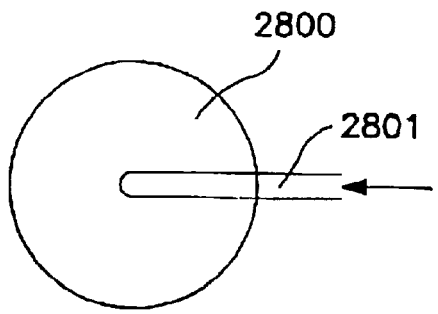
FIGS. 28a–28d are plan and side views of bladder styles of pressure simulating elements.
Figure 28B:
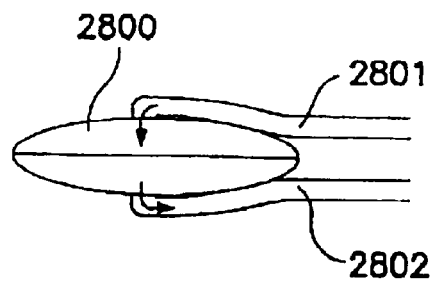
Figure 28C:
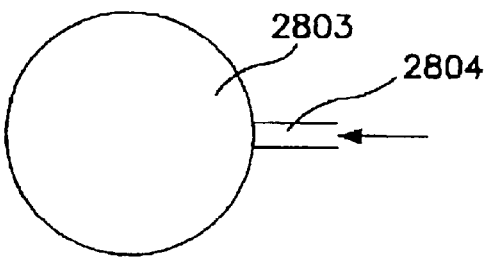
Figure 28D:
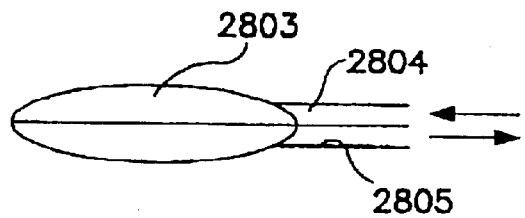
Figure 28E:
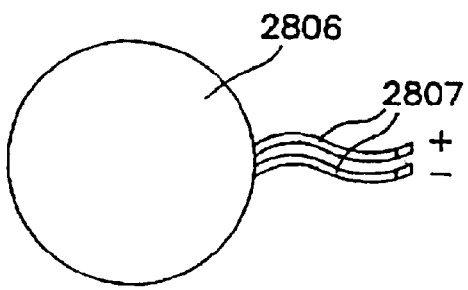
FIGS. 28e and 28f are plan and side cross-section views of a voice coil style of pressure simulator.
Figure 28F:
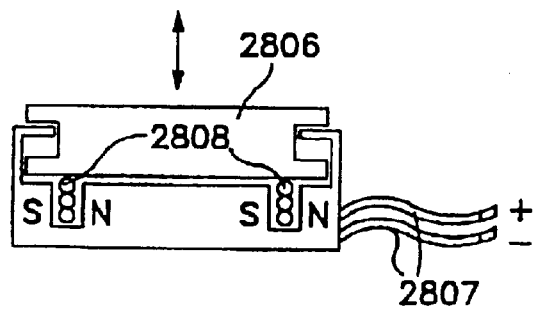

FIGS. 28a and b are plan and side views of a diaphram pressure-actuator. FIGS. 28e and 28f are a plan and side view of a voice-coil based pressure/displacement actuator.

While the invention has been described with reference to specific embodiments, the description is illustrative of the invention and is not to be construed as limiting the invention. Thus, various modifications and amplifications may occur to those skilled in the art without departing form the true spirit and scope of the invention as defined by the appended claims.

What is claimed is:

1. A device for applying a force between first and second portions of an animate body, said device comprising:
   first and second link assemblies associated with said first and second portions, respectively, each said first and second link assembly comprising:
   a. a supporting section secured in position on a portion, each supporting section being a supporting link; and
   b. an articulated link attached through a joint to each of said supporting links; wherein said articulated links of said first and second link assemblies are attached to each other through a pivot joint, with said articulated link of said second assembly extending beyond said pivot point;

first and second casings attached to a link in said first link assembly; and first and second tendons extending through said first and second casings, respectively, and attached to a link in said second link assembly, wherein one of said tendons is attached to said articulated link in said second link assembly on one side of said pivot joint and the other tendon is attached to said articulated link in said second link assembly on the opposite side of said pivot joint.

2. A device according to claim 1, further comprising a goniometer positioned to measure the angle of a joint.

3. A device according to claim 1, further comprising a force-generating means attached to at least one of said first and second tendons for generating a force between the link-attached end of said tendon and associated casing.

4. A device according to claim 1, wherein said animate body is a hand.

5. A device for applying a force between first and second portions of a hand, one of said portions being a phalanx, said device comprising:
   first and second link assemblies associated with said first and second portions, respectively, each link assembly comprising:
   a. a supporting section secured in position on a portion, each supporting section being a supporting link; and
   b. an articulated link attached through a joint to each of said supporting links; wherein said articulated links of said first and second link assemblies are attached to each other through a pivot joint, with said articulated link of said second assembly extending beyond said pivot point;

first and second casings attached to a link in said first link assembly; and first and second tendons extending through said first and second casings, respectively, and attached to a link in said second link assembly, wherein one of said tendons is attached to said articulated link in said second assembly on one side of said pivot joint and the other tendon is attached to said articulated link in said second assembly on the opposite side of said pivot joint.

6. A device according to claim 5, further comprising a force-generating means attached to at least one of said first and second tendons for generating a force between the link-attached end of said tendon and associated casing.

* * * * *